(12) United States Patent
Ellul et al.

(10) Patent No.: US 7,605,210 B2
(45) Date of Patent: Oct. 20, 2009

(54) FIBER-REINFORCED THERMOPLASTIC VULCANIZATES

(75) Inventors: Maria D. Ellul, Silver Lake, OH (US);
Rodney May, Wadsworth, OH (US);
Andre Van Meerbeek,
Saint-Symphorien (BE)

(73) Assignee: ExxonMobile Chemical Patents Inc.,
Houston, TX (US)

( * ) Notice: Subject to any disclaimer, the term of this patent is extended or adjusted under 35 U.S.C. 154(b) by 0 days.

(21) Appl. No.: 11/961,421

(22) Filed: Dec. 20, 2007

(65) Prior Publication Data

US 2009/0163665 A1 Jun. 25, 2009

(51) Int. Cl.
*C08F 10/00* (2006.01)
*C08L 23/00* (2006.01)
*C08L 55/00* (2006.01)

(52) U.S. Cl. .................. 525/64; 524/405; 524/456; 524/502; 524/504; 524/513; 524/514; 524/515; 524/522; 524/523; 524/525; 525/66; 525/67; 525/68; 525/69; 525/70; 525/78; 525/80; 525/85; 525/191; 525/194; 525/197; 525/221

(58) Field of Classification Search .................. 525/66, 525/64, 67, 68, 69, 70, 78, 80, 85, 191, 194, 525/197, 221, 222, 227, 228, 232, 240, 241; 524/405, 456, 502, 504, 513, 514, 515, 522, 524/523, 525

See application file for complete search history.

(56) References Cited

U.S. PATENT DOCUMENTS

| | | | | |
|---|---|---|---|---|
| 4,172,859 | A | 10/1979 | Epstein | ........................ 428/402 |
| 4,174,358 | A | 11/1979 | Epstein | ........................ 525/183 |
| 5,049,610 | A | 9/1991 | Takaki et al. | |
| 5,283,289 | A * | 2/1994 | Yamamoto et al. | .......... 525/133 |
| 5,684,082 | A | 11/1997 | Segatta | |
| 2006/0004126 | A1 * | 1/2006 | Park et al. | .................... 523/212 |
| 2006/0186583 | A1 | 8/2006 | Van Meerbeek et al. | |

FOREIGN PATENT DOCUMENTS

WO 2005/021643 3/2005

OTHER PUBLICATIONS

Campbell et al., "The Reinforcement of Thermoplastic Elastomers With Santoweb Fibre®"; *The Plastics and Rubber Institute, International Conference at Brunel University*, Uxbridge, Middlesex, UK, (1985), pp. 14/1-14/10.
Guo et al., "Mechanical Properties of PET Short Fiber-Polyester Thermoplastic Elastomer Composites," Journal of Applied Science (1993), vol. 49, pp. 1081-1091.
Saikrasun et al., "Kevlar reinforcement of polyolefin-based thermoplastic elastomer," Polymer 40 (1999), pp. 6437-6442.

* cited by examiner

*Primary Examiner*—Ana L Woodward

(57) ABSTRACT

A thermoplastic vulcanizate comprising of a dynamically-cured rubber; and a thermoplastic phase, where the thermoplastic phase includes fiber and the reaction product of a methylene donor and a methylene acceptor. The thermoplastic phase could include a functionalized thermoplastic resin.

12 Claims, 1 Drawing Sheet

FIBER-REINFORCED THERMOPLASTIC VULCANIZATES

FIELD OF THE INVENTION

One or more embodiments of the present invention are directed toward thermoplastic vulcanizates including fiber dispersed within the plastic phase.

BACKGROUND OF THE INVENTION

Automotive tubes and hoses, as well as hoses employed in similar environments, which provide for the transmission of various fluids and gases, have historically been fabricated by vulcanizing rubber with thermosetting compositions. These hoses have proven to be advantageously flexible and resistant to various fluids with which they contact. Also, fibers, such as continuous fiber cord, have been incorporated into the hose to provide useful burst strength, which is particularly advantageous in environments that experience variation in pressure.

While thermoset hoses have proven to be technologically useful, their method of manufacturing can be inefficient and limited by known techniques for forming thermoset rubber articles. Also, because the rubber is cured, the ability to recycle the hoses or materials from which they are made is severely limited.

Thermoplastic vulcanizates include blends of dynamically cured rubber and thermoplastic polymers. The rubber may be dispersed within the thermoplastic resin phase as finely-divided rubber particles. These compositions have advantageously demonstrated many of the properties of thermoset elastomers, yet they are processable as thermoplastics.

Thermoplastic vulcanizates have been advantageously employed to make hoses. These hoses can be efficiently fabricated by using extrusion techniques that take advantage of the melt processability of the thermoplastic vulcanizate. Also, the ability to melt process the thermoplastic vulcanizate allows for flexibility in recycling the hoses and the thermoplastic vulcanizate compositions.

The prior art has further recognized that advantages can be realized by reinforcing thermoplastic compositions with chopped fibers. Indeed, Campbell and Goettler explain methods for extruding articles, such as hoses, made from polyvinylchloride compositions where advantageous fiber alignment has been achieved. See THE REINFORCEMENT OF THERMOPLASTIC ELASTOMERS WITH SANTOWEB FIBRE®; The Plastics and Rubber Institute, International Conference at Brunel University, Uxbridge, Middlesex, UK, (1985).

Similar technology has been applied to thermoplastic vulcanizates as taught in U.S. Publication No. 2006/0186583. While the use of aligned, chopped fibers has proven advantageous, the prior art recognizes a need for adhesion between the fiber and the plastic matrix. Poor adhesion between the fiber and the plastic matrix is believed to deleteriously impact the extensibility of the thermoplastic vulcanizate. In view of this, U.S. Publication No. 2006/0186583 teaches the use of treated fibers.

Also, WO 2005/021643 A1 teaches thermoplastic elastomer compositions that include (i) a thermoplastic rubber blend, (ii) a functionalized polyolefin, (iii) a crosslinking agent selected from resins obtainable by reacting melamine, urea, benzoguanamine and/or glycoluril with formaldehyde, epoxy and isocyanate resins, and (iv) adhesion activated fibers.

Despite these advancements, improved compositions with better adhesion between the fiber and plastic matrix remains a goal because of expanding uses and needs, particularly in the automotive industry.

SUMMARY OF THE INVENTION

A thermoplastic vulcanizate comprising a dynamically-cured rubber, and a thermoplastic phase, and optionally a functionalized thermoplastic resin, where the thermoplastic phase includes fiber and the combination or reaction product of a methylene donor and a methylene acceptor.

A method of forming a fiber-reinforced thermoplastic vulcanizate, the method comprising of dynamically curing a rubber while the rubber is undergoing mixing with a thermoplastic resin to form a thermoplastic vulcanizate feedstock, and introducing fiber, a methylene donor, a methylene acceptor, and optionally, a functionalized thermoplastic with the thermoplastic vulcanizate feedstock to form the fiber-reinforced thermoplastic vulcanizate.

DETAILED DESCRIPTION OF ILLUSTRATIVE EMBODIMENTS

Figure 1:
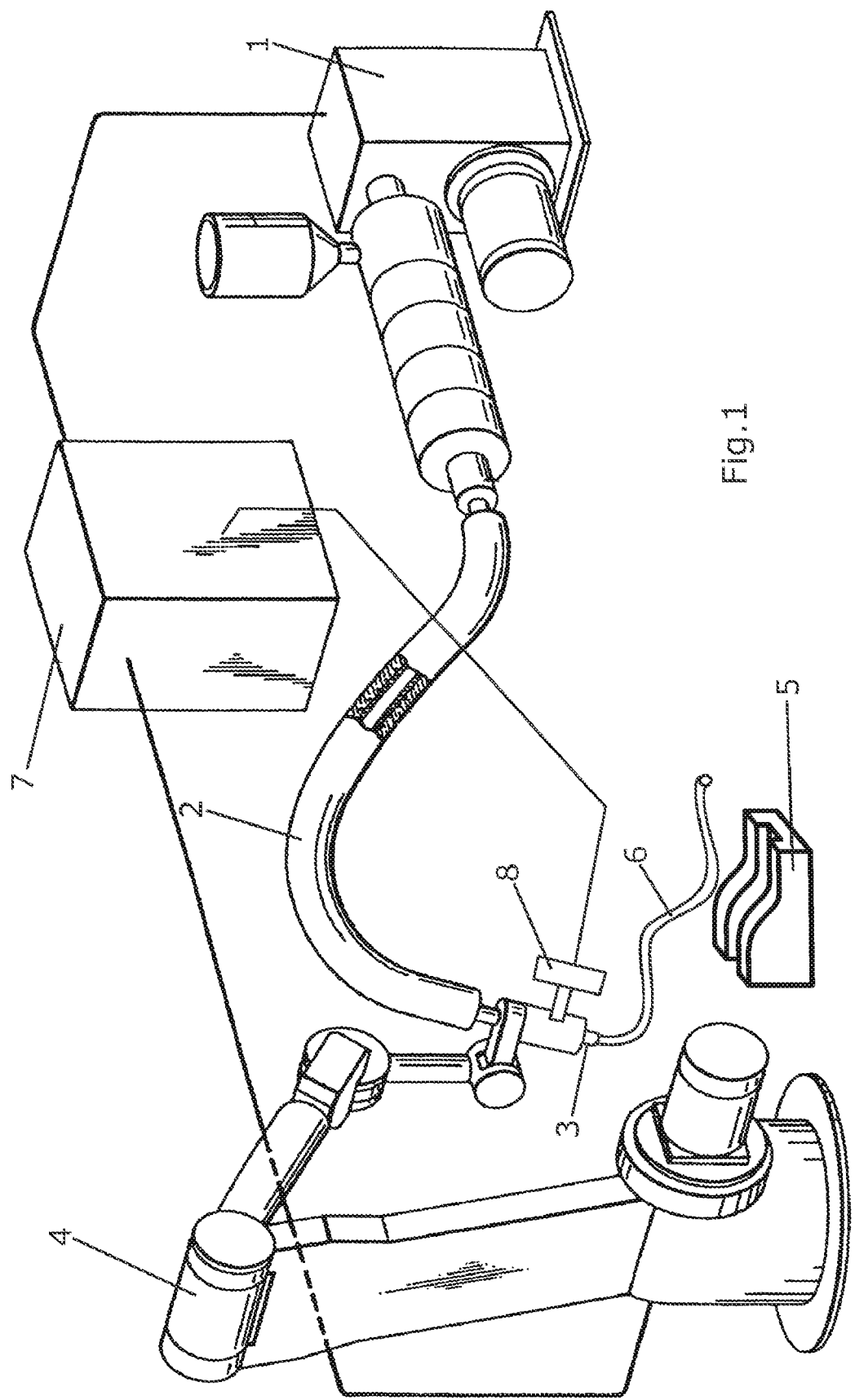
FIG. 1 is a perspective view of an apparatus that is useful for fabricating hoses using the composition of one or more embodiments of the present invention.

One or more embodiments of the present invention are directed toward thermoplastic vulcanizate compositions that include fiber reinforcement. In one or more embodiments, the fibers may be dispersed within the plastic phase of the thermoplastic vulcanizate. The presence of the reaction product of a methylene donor and methylene acceptor has unexpectedly provided advantageous properties. In these or other embodiments, the presence of this reaction product, together with the presence of a functionalized thermoplastic polymer, has provided further unexpected results. It is believed that a synergism may exist between the functionalized thermoplastic polymer, the reaction product of the methylene acceptor and methylene donor, the fiber, and optionally one of the other constituents in the thermoplastic vulcanizate. The fiber-reinforced thermoplastic vulcanizates of one or more embodiments of the present invention are particularly useful for fabricating hoses and the like.

The thermoplastic vulcanizates include a cured rubber phase and a thermoplastic phase. These compositions are prepared by dynamic vulcanization of a rubber in the presence of a thermoplastic polymer. In one or more embodiments, the fiber, the methylene donor and the methylene acceptor are introduced to a thermoplastic vulcanizate composition, (which may be referred to as a thermoplastic vulcanizate feedstock) after dynamic vulcanization. When employed, the functionalized thermoplastic polymer may be introduced to the feedstock before or after dynamic vulcanization.

Thermoplastic Vulcanizate Ingredients

Rubber Component

The rubbers that may be employed to form the rubber phase include those polymers that are capable of being cured or crosslinked. Reference to a rubber may include mixtures of more than one rubber. Non-limiting examples of rubbers include olefinic elastomeric copolymers, butyl rubber, and mixtures thereof. In one or more embodiments, olefinic elastomeric copolymers include ethylene-propylene-non-conjugated diene rubbers or propylene-based rubbery copolymers containing units derived from non-conjugated diene monomers.

Ethylene-Propylene Rubber

The term ethylene-propylene rubber refers to rubbery copolymers polymerized from ethylene, at least one α-olefin monomer, and at least one diene monomer. The α-olefins may include, but are not limited to, propylene, 1-butene, 1-hexene, 4-methyl-1-pentene, 1-octene, 1-decene, or combinations thereof. In one embodiment, the α-olefins include propylene, 1-hexene, 1-octene or combinations thereof. The diene monomers may include, but are not limited to, 5-ethylidene-2-norbornene; 5-vinyl-2-norbornene; divinylbenzene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; or a combination thereof. Copolymers prepared from ethylene, α-olefin, and diene monomers may be referred to as a terpolymer or even a tetrapolymer in the event that multiple α-olefins or dienes are used.

In one or more embodiments, the ethylene-propylene rubber includes from about 12 to about 85% by weight, or from about 20 to about 80% by weight, or from about 40 to about 70% by weight, or from about 60 to about 66% by weight ethylene units deriving from ethylene monomer, and from about 0.1 to about 15% by weight, or from about 0.5 to about 12% by weight, or from about 1 to about 10% by weight, or from about 2 to about 8% by weight diene units deriving from diene monomer, with the balance including α-olefin units deriving from α-olefin monomer (e.g., $C_3$-$C_{10}$ olefins such as propylene). Expressed in mole %, the terpolymer of one embodiment includes from about 0.1 to about 5 mole %, or from about 0.5 to about 4 mole %, or from about 1 to about 2.5 mole % diene units deriving from diene monomer. In one or more embodiments, where the diene includes 5-ethylidene-2-norbornene, the ethylene-propylene rubber may include at least 1% by weight, in other embodiments at least 3% by weight, in other embodiments at least 4% by weight, in other embodiments at least 5% by weight, in other embodiments from about 1 to about 15% by weight, in other embodiments from about 5% to about 12% by weight, and in other embodiments from about 7% to about 11% by weight units deriving from 5-ethylidene-2-norbornene. In one or more embodiments, where the diene includes 5-ethylidene-2-norbornene, the ethylene-propylene rubber may include at least 1% by weight, in other embodiments at least 3% by weight, in other embodiments at least 4% by weight, in other embodiments at least 5% by weight, in other embodiments from about 1 to about 15% by weight, in other embodiments from about 5% to about 12% by weight, and in other embodiments from about 7% to about 11% by weight units deriving from 5-ethylidene-2-norbornene. In one or more embodiments, where the diene includes 5-vinyl-2-norbornene, the ethylene-propylene rubber may include at least 1% by weight, in other embodiments at least 3% by weight, in other embodiments at least 4% by weight, in other embodiments at least 5% by weight, in other embodiments from about 1 to about 15% by weight, in other embodiments from about 5% to about 12% by weight, and in other embodiments from about 7% to about 11% by weight units deriving from 5-vinyl-2-norbornene.

In one or more embodiments, ethylene-propylene rubber may have a weight average molecular weight ($M_w$) that is greater than 100,000 g/mole, in other embodiments greater than 200,000 g/mole, in other embodiments greater than 400,000 g/mole, and in other embodiments greater than 600,000 g/mole; in these or other embodiments, the $M_w$ of the preferred ethylene-propylene rubber is less than 1,200,000 g/mole, in other embodiments less than 1,000,000 g/mole, in other embodiments less than 900,000 g/mole, and in other embodiments less than 800,000 g/mole. In one or more embodiments, useful ethylene-propylene rubbers have a number average molecular weight ($M_n$) that is greater than 20,000 g/mole, in other embodiments greater than 60,000 g/mole, in other embodiments greater than 100,000 g/mole, and in other embodiments greater than 150,000 g/mole; in these or other embodiments, the $M_n$ of the ethylene-propylene rubbers of one or more embodiments is less than 500,000 g/mole, in other embodiments less than 400,000 g/mole, in other embodiments less than 300,000 g/mole, and in other embodiments less than 250,000 g/mole. Techniques for determining the molecular weight ($M_n$, $M_w$ and $M_z$) and molecular weight distribution (MWD) may be found in U.S. Pat. No. 4,540,753 (Cozewith, Ju and Verstrate) (which is incorporated by reference herein for purposes of U.S. practices) and references cited therein and in Macromolecules, 1988, volume 21, p 3360 (Verstrate et al.), which is herein incorporated by reference for purposes of U.S. practices, and references cited therein.

In one or more embodiments, ethylene-propylene rubber may also be characterized by having a Mooney viscosity ($ML_{(1+4)}$ at 125° C.) per ASTM D-1646, of from about 10 to about 500 or from about 50 to about 450. As used herein, Mooney viscosity is reported using the format: Rotor ([preheat time, min.]+[shearing time, min.] @ measurement temperature, ° C.), such that ML (1+4@125° C.) indicates a Mooney viscosity determined using the ML or large rotor according to ASTM D1646-99, for a pre-heat time of 1 minute and a shear time of 4 minutes, at a temperature of 125° C.

Unless otherwise specified, Mooney viscosity is reported herein as ML(1+4 @125° C.) in Mooney units according to ASTM D-1646. However, Mooney viscosity values greater than about 100 cannot generally be measured under these conditions. In this event, a higher temperature can be used (i.e., 150° C.), with eventual longer shearing time (i.e., 1+8@125° C. or 150° C.) More preferably, the Mooney measurement for purposes herein is carried out using a non-standard small rotor. The non-standard rotor design is employed with a change in the Mooney scale that allows the same instrumentation on the Mooney instrument to be used with polymers having a Mooney viscosity over about 100 ML(1+4@125° C.). For purposes herein, this modified Mooney determination is referred to as MST—Mooney Small Thin.

ASTM D1646-99 prescribes the dimensions of the rotor to be used within the cavity of the Mooney instrument. This method allows for both a large and a small rotor, differing only in diameter. These different rotors are referred to in ASTM D1646-99 as ML (Mooney Large) and MS (Mooney Small). However, EPDM can be produced at such high molecular weight that the torque limit of the Mooney instrument can be exceeded using these standard prescribed rotors. In these instances, the test is run using the MST rotor that is both smaller in diameter and thinner. Typically, when the MST rotor is employed, the test is also run at different time constants and temperatures. The pre-heat time is changed from the standard 1 minute to 5 minutes, and the test is run at 200° C. instead of the standard 125° C. The value obtained under these modified conditions is referred to herein as MST (5+4@200° C.). Note: the run time of 4 minutes at the end of which the Mooney reading is taken remains the same as the standard conditions. One MST point is approximately equivalent to 5 ML points when MST is measured at (5+4@200° C.) and ML is measured at (1+4@125° C.). Accordingly, for the purposes of an approximate conversion between the two scales of measurement, the MST (5+4@200° C.) Mooney value is multiplied by 5 to obtain an approximate ML(1+4@125° C.) value equivalent. The MST rotor used herein was prepared and utilized according to the following specifications:

The rotor should have a diameter of 30.48+/−0.03 mm and a thickness of 2.8+/−0.03 mm (determined from the tops of serrations) and a shaft of 11 mm or less in diameter.

The rotor should have a serrated face and edge, with square grooves of about 0.8 mm width and depth of about 0.25-0.38 mm cut on 1.6 mm centers. The serrations will consist of two sets of grooves at right angles to each other thereby forming a square crosshatch.

The rotor shall be positioned in the center of the die cavity such that the centerline of the rotor disk coincides with the centerline of the die cavity to within a tolerance of +/−0.25 mm. A spacer or a shim may be used to raise the shaft to the midpoint, consistent with practices typical in the art for Mooney determination.

The wear point (cone shaped protuberance located at the center of the top face of the rotor) shall be machined off flat with the face of the rotor.

Mooney viscosities of the multimodal polymer composition may be determined on blends of polymers herein. The Mooney viscosity of a particular component of the blend is obtained herein using the relationship shown in (1):

$$\log ML = n_A \log ML_A + n_B \log ML_B \quad (1)$$

wherein all logarithms are to the base 10; ML is the Mooney viscosity of a blend of two polymers A and B each having individual Mooney viscosities $ML_A$ and $ML_B$, respectively; $n_A$ represents the wt % fraction of polymer A in the blend; and nB represents the wt % fraction of the polymer B in the blend.

In the instant disclosure, Equation (1) has been used to determine the Mooney viscosity of blends comprising a high Mooney viscosity polymer (A) and a low Mooney viscosity polymer (B), which have measurable Mooney viscosities under (1+4@125° C.) conditions. Knowing ML, $ML_A$ and $n_A$, the value of $ML_B$ can be calculated.

However, for high Mooney viscosity polymers (i.e., Mooney viscosity greater than 100 ML(1+4@125° C.), $ML_A$ is measured using the MST rotor as described above. The Mooney viscosity of the low molecular weight polymer in the blend is then determined using Equation 1 above, wherein $ML_A$ is determined using the following correlation (2):

$$ML_A (1+4@125° C.) = 5.13 * MST_A (5+4@200° C.)$$

In one or more embodiments, ethylene-propylene rubber may be characterized by having an intrinsic viscosity, as measured in decalin at 135° C. per ASTM D-1601, of from about 1 to about 8 dl/g, or from about 3 to about 7 dl/g, or from about 4 to about 6.5 dl/g.

In one or more embodiments, the ethylene-propylene rubber may be characterized by a glass transition temperature ($T_g$), as determined by Differential Scanning Calorimetry (DSC) according to ASTM E-1356, that is less than −20° C., in other embodiments less than −30° C., in other embodiments less than −50° C., and in other embodiments from about −20 to about −60° C.

Ethylene-propylene rubber may be manufactured or synthesized by using a variety of techniques. For example, these copolymers can be synthesized by employing solution, slurry, or gas phase polymerization techniques that employ various catalyst systems. Exemplary catalysts include Ziegler-Natta systems such as those including vanadium catalysts, and single-site catalysts including constrained geometry catalysts involving Group IV-VI metallocenes. Elastomeric copolymers are commercially available under the tradenames Vistalon™ (ExxonMobil Chemical Co.; Houston, Tex.), Keltan™ (DSM Copolymers), Nordel™ TP (Dow), NORDEL MG™ (Dow), Royalene™ (Lion Copolymer) and Buna™ (Lanxess).

Propylene-Based Rubbery Copolymer

In one or more embodiments, the propylene-based rubbery copolymer, which may also be referred to as propylene-α-olefin copolymers or propylene-based elastomers, include units (i.e., mer units) derived from propylene, one or more comonomer units derived from ethylene or α-olefins including from 4 to about 20 carbon atoms, and optionally one or more comonomer units derived from dienes. In one or more embodiments, the α-olefin comonomer units may derive from ethylene, 1-butene, 1-hexane, 4-methyl-1-pentene and/or 1-octene. In one or more embodiments, the diene comonomer units may derive from 5-ethylidene-2-norbornene, 5-vinyl-2-norbornene, divinyl benzene, 1,4-hexadiene, 5-methylene-2-norbornene, 1,6-octadiene, 5-methyl-1,4-hexadiene, 3,7-dimethyl-1,6-octadiene, 1,3-cyclopentadiene, 1,4-cyclohexadiene, dicyclopentadiene, or a combination thereof. The embodiments described below are discussed with reference to ethylene as the α-olefin comonomer, but the embodiments are equally applicable to other copolymers with other α-olefin comonomers. In this regard, the copolymer may simply be referred to as propylene-based rubbery copolymers with reference to ethylene as the α-olefin.

In one or more embodiments, the propylene-based rubbery copolymers may include at least 5% by weight, in other embodiments at least 6% by weight, in other embodiments at least 8% by weight, and in other embodiments at least 10% by weight ethylene-derived units; in these or other embodiments, the copolymers may include up to 35% by weight, in other embodiments up to 32% by weight, in other embodiments up to 25% by weight, and in other embodiments up to 20% by weight ethylene-derived units, where the percentage by weight is based upon the total weight of the propylene-derived, and α-olefin derived units. Stated another way, the propylene-based rubbery copolymers may include at least 60% by weight, or in other embodiments at least 80% by weight, propylene-derived units; and in these or other embodiments, the copolymers may include up to 95% by weight, in other embodiments up to 94% by weight, in other embodiments up to 92% by weight, and in other embodiments up to 90% by weight propylene-derived units, where the percentage by weight is based upon the total weight of the propylene-derived and ethylene-derived mer units.

In one or more embodiments, the propylene-based rubbery copolymers may include at least 0.5% by weight, in other embodiments at least 1.5% by weight, and in other embodiments at least 3% by weight diene-derived units; in these or other embodiments, the propylene-based rubbery copolymers may include up to 11% by weight, in other embodiments up to 6% by weight, and in other embodiments up to 4% by weight diene-derived units, where the percentage by weight is based upon the total weight of the propylene-derived, ethylene-derived, and diene-derived units.

The propylene-based rubbery copolymers in one or more embodiments of this invention are characterized by having a single melting temperature as determined by differential scanning calorimetry (DSC). The melting point is defined as the temperature of the greatest heat absorption within the range of melting of the sample. The propylene-based rubbery copolymer may show secondary melting peaks adjacent to the principal peak, but for purposes herein, these secondary melting peaks are considered together as a single melting point, with the highest of these peaks being considered the melting point ($T_m$) of the propylene-based rubbery copolymer. In one or more embodiments, the $T_m$ of the propylene-based rubbery copolymer is less than 110° C., in other embodiments less than 90° C., in other embodiments less than 80° C., and in other embodiments less than 70° C.; in these or other embodiments, the propylene-based rubbery copolymer has a $T_m$ of at least 25° C., in other embodiments at least of 35° C., in other embodiments at least of 40° C., and in other embodiments at least of 45° C. In particular embodiments, the propylene-based rubbery copolymer exhibits no melting point.

In one or more embodiments, the propylene-based rubbery copolymer may be characterized by a heat of fusion (Hf), as determined according to DSC procedures according to ASTM E-793. This may be determined by placing 6 to 10 mg of sample into DSC equipment and heating the sample at about 10° C./min. In one or more embodiments, the propylene-based rubbery copolymer may be characterized by a heat of fusion of about 0 J/g, in other embodiments at least 0.5 J/g, in other embodiments at least 1.0 J/g, in other embodiments at least 1.5 J/g, in other embodiments at least 3.0, in other embodiments at least 4.0, in other embodiments at least 6.0, and in other embodiments at least 7.0. In these or other embodiments, the propylene-based rubbery copolymer may be characterized by a heat of fusion that of less than 80 J/g, in other embodiments less than 70 J/g, in other embodiments less than 60 J/g, in other embodiments less than 50 J/g, in other embodiments less than 40 J/g, in other embodiments up to 40 J/g, and in other embodiments less than 30 J/g.

The propylene-based rubbery copolymer can have a triad tacticity of propylene units, as measured by $^{13}$C NMR, of 75% or greater, 80% or greater, 82% or greater, 85% or greater, or 90% or greater. In one or more embodiments, ranges include from about 50 to about 99%, in other embodiments from about 60 to about 99%, in other embodiments from about 75 to about 99%, in other embodiments from about 80 to about 99%, and in other embodiments from about 60 to about 97%. Triad tacticity is determined by the methods described in U.S. Patent Application Publication No. 2004/0236042.

In one or more embodiments, the propylene-based rubbery copolymer may have a % crystallinity of from 0.5% to 40%, in other embodiments 1% to 30%, and in other embodiments 5% to 25%. Crystallinity may be determined according to DSC procedures in accordance with ASTM E-794-95. This may be determined by placing 6 to 10 mg of sample into DSC equipment and heating the sample at about 10° C./min. For use herein, the crystallinity of the propylene-based rubbery copolymer can also be expressed in terms of percentage of crystallinity. The thermal energy for the highest order of polypropylene is estimated at 209 J/g (i.e., 100% crystallinity is equal to 209 J/g). In other embodiments, the propylene-ethylene polymer may have a crystallinity of less than 40%, in other embodiments about 0.25% to about 25%, in other embodiments from about 0.5% to about 22%, and in other embodiments from about 0.5% to about 20%. In particular embodiments, the propylene-based rubbery copolymer has a crystallinity of 0%.

In one or more embodiments, the propylene-based rubbery copolymer can have a density of about 0.85 g/cm$^3$ to about 0.92 g/cm$^3$, in other embodiments about 0.87 g/cm$^3$ to 0.90 g/cm$^3$, and in other embodiments from about 0.88 g/cm$^3$ to about 0.89 g/cm$^3$ at room temperature as measured per the ASTM D-792 test method.

In one or more embodiments, the propylene-based rubbery copolymer can have a melt index (MI) (ASTM D-1238, 2.16 kg @190° C.), of less than 10 dg/min, in other embodiments ≦6.5 dg/min, in other embodiments ≦6 dg/min, in other embodiments ≦5.5 dg/min, and in other embodiments ≦5 dg/min.

In one or more embodiments, the propylene-based rubbery copolymer can have a melt flow rate (MFR) (ASTM D-1238, 2.16 kg @230° C.), equal to or greater than 0.2 dg/min, in other embodiments of at least 0.2 dg/min, in other embodiments at least 0.5 dg/min, and in other embodiments at least 1.0 dg/min. In these or other embodiments, the melt flow rate may be equal to or less than 350 dg/min, and in other embodiments less than 100 dg/min. In an embodiment, the propylene-based polymer has MFR of 0.5 dg/min to 350 dg/min, in other embodiments from 2 dg/min to 30 dg/min, in other embodiments from 5 dg/min to 30 dg/min, in other embodiments 10 dg/min to 30 dg/min, and in other embodiments 10 dg/min to about 25 dg/min.

In one or more embodiments, the propylene-based rubbery copolymers may have a Mooney viscosity [ML (1+4)@125° C.], as determined according to ASTM D-1646, of less than 100, in other embodiments less than 75, in other embodiments less than 60, and in other embodiments less than 30.

In one or more embodiments, the propylene-based rubbery copolymer can have a $M_w$ of about 5,000 to about 5,000,000 g/mole, in other embodiments a $M_w$ of about 10,000 to about 1,000,000 g/mole, in other embodiments a $M_w$ of about 20,000 to about 500,000, g/mole and in other embodiments a $M_w$ of about 50,000 to about 400,000 g/mole.

In one or more embodiments, the propylene-based rubbery copolymer can have a $M_n$ of about 2,500 to about 2,500,000 g/mole, in other embodiments a $M_n$ of about 5,000 to about 500,000 g/mole, in other embodiments a $M_n$ of about 10,000 to about 250,000 g/mole, and in other embodiments a $M_n$ of about 25,000 to about 200,000 g/mole.

In one or more embodiments, the propylene-based rubbery copolymer can have a Z-average molecular weight ($M_z$) of about 10,000 to about 7,000,000 g/mole, in other embodiments a $M_z$ of about 50,000 to about 1,000,000 g/mole, in other embodiments a $M_z$ of about 80,000 to about 700,000 g/mole, and in other embodiments a $M_z$ of about 100,000 to about 500,000 g/mole.

In one or more embodiments, the molecular weight distribution index (MWD=($M_w/M_n$)) of the propylene-based rubbery copolymer may be about 1 to about 40, in other embodiments about 1 to about 5, in other embodiments about 1.8 to about 5, and in other embodiments about 1.8 to about 3.

Butyl Rubber

In one or more embodiments, butyl rubber includes copolymers and terpolymers of isobutylene and at least one other comonomer. Useful comonomers include isoprene, divinyl aromatic monomers, alkyl substituted vinyl aromatic monomers, and mixtures thereof. Exemplary divinyl aromatic monomers include vinylstyrene. Exemplary alkyl substituted vinyl aromatic monomers include α-methylstyrene and paramethylstyrene. These copolymers and terpolymers may also be halogenated such as in the case of chlorinated and brominated butyl rubber. In one or more embodiments, these halogenated polymers may derive from monomer such as parabromomethylstyrene.

In one or more embodiments, butyl rubber includes copolymers of isobutylene and isoprene, and copolymers of isobutylene and paramethyl styrene, terpolymers of isobutylene, isoprene, and vinylstyrene, branched butyl rubber, and brominated copolymers of isobutene and paramethylstyrene (yielding copolymers with parabromomethylstyrenyl mer units). These copolymers and terpolymers may be halogenated.

In one embodiment, where butyl rubber includes the isobutylene-isoprene copolymer, the copolymer may include from about 0.5 to about 30, or from about 0.8 to about 5, % by weight isoprene based on the entire weight of the copolymer with the remainder being isobutylene.

In another embodiment, where butyl rubber includes isobutylene-paramethylstyrene copolymer, the copolymer may include from about 0.5 to about 25, and from about 2 to about 20, % by weight paramethylstyrene based on the entire weight of the copolymer with the remainder being isobutylene. In one embodiment, isobutylene-paramethyl styrene copolymers can be halogenated, such as with bromine, and these halogenated copolymers can contain from about 0 to about 10% by weight, or from about 0.3 to about 7% by weight halogenation.

In other embodiments, where butyl rubber includes isobutylene-isoprene-divinylbenzene, the terpolymer may include from about 95 to about 99, or from about 96 to about 98.5, % by weight isobutylene, and from about 0.5 to about 5, or from about 0.8 to about 2.5, % by weight isoprene based on the entire weight of the terpolymer, with the balance being divinylbenzene.

In the case of halogenated butyl rubbers, the butyl rubber may include from about 0.1 to about 10, or from about 0.3 to about 7, or from about 0.5 to about 3% by weight halogen based upon the entire weight of the copolymer or terpolymer.

In one or more embodiments, the $T_g$ of useful butyl rubber can be less than about −55° C., or less than about −58° C., or less than about −60° C., or less than about −63° C.

In one or more embodiments, the Mooney viscosity ($ML_{1+8}$@125° C.) of useful butyl rubber can be from about 25 to about 75, or from about 30 to about 60, or from about 40 to about 55.

Butyl rubber can be obtained from a number of commercial sources as disclosed in the Rubber World Blue Book. For example, both halogenated and un-halogenated copolymers of isobutylene and isoprene are available under the tradename Exxon Butyl™ (ExxonMobil Chemical Co.), halogenated and un-halogenated copolymers of isobutylene and paramethylstyrene are available under the tradename EXXPRO™ (ExxonMobil Chemical Co.), star branched butyl rubbers are available under the tradename STAR BRANCHED BUTYL™ (ExxonMobil Chemical Co.), and copolymers containing parabromomethylstyrenyl mer units are available under the tradename EXXPRO 3745 (ExxonMobil Chemical Co.). Halogenated and non-halogenated terpolymers of isobutylene, isoprene, and divinylstyrene or divinyl benzene are available under the tradename Polysar Butyl™ (Lanxess; Germany).

Thermoplastic Component

Unfunctionalized Thermoplastic Component

The thermoplastic phase may include those thermoplastic polymers that have been employed in the manufacture of thermoplastic vulcanizates as taught in the art. For example, these thermoplastic polymers, which may be referred to as thermoplastic resins or unfunctionalized thermoplastics, may include solid, generally high molecular weight plastic resins. Exemplary thermoplastic polymers include crystalline, semi-crystalline, and crystallizable polyolefins, olefin copolymers, and non-olefin resins.

The thermoplastic resins may be formed by polymerizing ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and/or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof is also contemplated. Specifically included are the reactor, impact, and random copolymers of propylene with ethylene or the higher α-olefins, described above, or with $C_{10}$-$C_{20}$ diolefins. Comonomer contents for these propylene copolymers may be from 1% to about 30% by weight of the polymer, for example, See U.S. Pat. No. 6,867,260 B2. Copolymers available under the tradename VISTAMAXX™ (ExxonMobil) are specifically included. Other polyolefin copolymers may include copolymers of olefins with styrene such as styrene-ethylene copolymer or polymers of olefins with α,β-unsaturated acids, α,β-unsaturated esters such as polyethylene-acrylate copolymers. Non-olefin thermoplastic polymers may include polymers and copolymers of styrene, α,β-unsaturated acids, α,β-unsaturated esters, and mixtures thereof. For example, polystyrene, polyacrylate, and polymethacrylate may be used. Blends or mixtures of two or more polyolefin thermoplastics such as described herein, or with other polymeric modifiers, are also suitable in accordance with this invention. Useful thermoplastic polymers may also include impact and reactor copolymers.

In one or more embodiments, the thermoplastic resins include propylene-based polymers including those solid, generally high-molecular weight plastic resins that primarily comprise units deriving from the polymerization of propylene. In certain embodiments, at least 75%, in other embodiments at lease 90%, in other embodiments at least 95%, and in other embodiments at least 97% of the units of the propylene-based polymer derive from the polymerization of propylene. In particular embodiments, these polymers include homopolymers of propylene.

In certain embodiments, the propylene-based polymers may also include units deriving from the polymerization of ethylene and/or α-olefins such as 1-butene, 1-hexene, 1-octene, 2-methyl-1-propene, 3-methyl-1-pentene, 4-methyl-1-pentene, 5-methyl-1-hexene, and mixtures thereof. Specifically included are the reactor, impact, and random copolymers of propylene with ethylene or the higher α-olefins, described above, or with $C_{10}$-$C_{20}$ olefins.

In one or more embodiments, propylene-based polymers may include semi-crystalline polymers. In one or more embodiments, these polymers may be characterized by a crystallinity of at least 25% by weight, in other embodiments at least 55% by weight, in other embodiments at least 65%, and in other embodiments at least 70% by weight. Crystallinity may be determined by dividing the heat of fusion of a sample by the heat of fusion of a 100% crystalline polymer, which is assumed to be 209 joules/gram for polypropylene. In one or more embodiments, these polymers may be characterized by a Hf of at least 52.3 J/g, in other embodiments in excess of 100 J/g, in other embodiments in excess of 125 J/g, and in other embodiments in excess of 140 J/g.

In one or more embodiments, useful propylene-based polymers may be characterized by an $M_w$ of from about 50 to about 2,000 kg/mole, and in other embodiments from about 100 to about 600 kg/mole. They may also be characterized by a $M_n$ of about 25 to about 1,000 kg/mole, and in other embodiments about 50 to about 300 kg/mole, as measured by GPC with polystyrene standards.

In one or more embodiments, useful propylene-based polymers can have a MFR (ASTM D-1238, 2.16 kg @230° C.) of about 0.2 to 5,000 dg/min, in other embodiments from about 5 to about 500 dg/min, and in other embodiments from about 10 to about 100 dg/min.

In one ore more embodiments, useful propylene-based polymers can have a $T_m$ that is from about 110° C. to about 170° C., in other embodiments from about 140° C. to about 168° C., and in other embodiments from about 160° C. to about 165° C. They may have a $T_g$ of from about −10 to about 10° C., in other embodiments from about −3 to about 5° C., and in other embodiments from about 0° C. to about 2° C. In one or more embodiments, they may have a crystallization temperature ($T_c$) of at least about 75° C., in other embodiments at least about 95° C., in other embodiments at least about 100° C., and in other embodiments at least 105° C., with one embodiment ranging from 105° to 130° C.

The propylene-based polymers may be synthesized by using an appropriate polymerization technique known in the art such as, but not limited to, the conventional Ziegler-Natta type polymerizations, and catalysis employing single-site organometallic catalysts including, but not limited to, metallocene catalysts.

In particular embodiments, the propylene-based polymers include a homopolymer of a high-crystallinity isotactic or syndiotactic polypropylene. This polypropylene can have a density of from about 0.89 to about 0.91 g/cc, with the largely isotactic polypropylene having a density of from about 0.90 to about 0.91 g/cc. Also, high and ultrahigh molecular weight polypropylene that has a fractional melt flow rate can be employed. In one or more embodiments, polypropylene resins may be characterized by a MFR (ASTM D-1238; 2.16 kg @230° C.) that is less than or equal to 10 dg/min, in other embodiments less than or equal to 1.0 dg/min, and in other embodiments less than or equal to 0.5 dg/min.

Functionalized Thermoplastic

In addition to the foregoing thermoplastic resins, which are unfunctionalized, the plastic phase of the fiber-reinforced thermoplastic vulcanizates of the present invention may also include a functionalized thermoplastic polymer.

The functionalized thermoplastic polymer, which may also be referred to as a functionalized thermoplastic resin, includes at least one functional group. The functional group, which may also be referred to as a functional substituent or functional moiety, includes a hetero atom. In one or more embodiments, the functional group includes a polar group. Examples of polar groups include hydroxy, propoxy, carbonyl, ether, halide, amine, imine, isocyanato (i.e. isocyanate moiety), and nitrile groups. Exemplary groups containing a carbonyl moiety include carboxylic acid, anhydride, ketone, acid halide, ester, amide, or imide groups, and derivatives thereof. In one embodiment, the functional group includes a succinic anhydride group, or the corresponding acid, which may derive from a reaction (e.g., polymerization or grafting reaction) with maleic anhydride, or a β-alkyl substituted propanoic acid group or derivative thereof. In one or more embodiments, the functional group is pendant to the backbone of the hydrocarbon polymer.

In one or more embodiments, the functionalized thermoplastic polymer may be prepared by grafting a graft monomer to a thermoplastic polymer. The process of grafting may include combining, contacting, or reacting a thermoplastic polymer with a graft monomer. These functionalized thermoplastic polymers include those described in U.S. Pat. Nos. 4,957,968, 5624,999, and 6,503,984.

The thermoplastic polymer that can be grafted with the graft monomer may include solid, generally high molecular weight plastic materials. These plastics include crystalline and semi-crystalline polymers. In one or more embodiments, these thermoplastic polymers may be characterized by a crystallinity of at least 20%, in other embodiments at least 25%, and in other embodiments at least 30%. Crystallinity may be determined by dividing the heat of fusion of a sample by the heat of fusion of a 100% crystalline polymer, which is assumed to be 209 joules/gram for isotactic polypropylene or 350 joules/gram for polyethylene. Heat of fusion can be determined by differential scanning calorimetry. In these or other embodiments, the thermoplastic polymers to be functionalized may be characterized by having a heat of fusion of at least 40 J/g, in other embodiments in excess of 50 J/g, in other embodiments in excess of 75 J/g, in other embodiments in excess of 95 J/g, and in other embodiments in excess of 100 J/g.

In one or more embodiments, the thermoplastic polymers, prior to grafting, may be characterized by a weight average molecular weight ($M_w$) of from about 100 kg/mole to about 2,000 kg/mole, and in other embodiments from about 300 kg/mole to about 600 kg/mole. They may also be characterized by a number-average molecular weight ($M_n$) of about 80 kg/mole to about 800 kg/mole, and in other embodiments about 90 kg/mole to about 200 kg/mole. Molecular weight may be determined by size exclusion chromatography (SEC) by using a Waters 150 gel permeation chromatograph equipped with the differential refractive index detector and calibrated using polystyrene standards.

In one or more embodiments, these thermoplastic polymers, prior to grafting, may be characterized by an MFR of from about 0.3 to about 2,000 dg/min, in other embodiments from about 0.5 to about 1,000 dg/min, and in other embodiments from about 1 to about 1,000 dg/min, (ASTM D-1238, 2.16 gk at 230° C.).

In one or more embodiments, these thermoplastic resins, prior to grafting, may have a melt temperature ($T_m$) that is from about 110° C. to about 250° C., in other embodiments from about 120 to about 170° C., and in other embodiments from about 130° C. to about 165° C. In one or more embodiments, they may have a crystallization temperature ($T_c$) of these optionally at least about 75° C., in other embodiments at least about 95° C., in other embodiments at least about 100° C., and in other embodiments at least 105° C., with one embodiment ranging from 105° to 115° C.

Exemplary thermoplastic polymers that may be grafted include polyolefins, polyolefin copolymers, and non-olefin thermoplastic polymers. Polyolefins may include those thermoplastic polymers that are formed by polymerizing ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and/or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof is also contemplated. Other polyolefin copolymers may include copolymers of olefins with styrene such as styrene-ethylene copolymer or polymers of olefins with α,β-unsaturated acids, α,β-unsaturated esters such as polyethylene-acrylate copolymers. Non-olefin thermoplastic polymers may include polymers and copolymers of styrene, α,β-unsaturated acids, α,β-unsaturated esters, and mixtures thereof. For example, polystyrene, polyacrylate, and polymethacrylate may be functionalized.

These homopolymers and copolymers may be synthesized by using an appropriate polymerization technique known in the art. These techniques may include conventional Ziegler-Natta, type polymerizations, catalysis employing single-site organometallic catalysts including, but not limited to, metallocene catalysts, and high-pressure free radical polymerizations.

The degree of functionalization of the functionalized thermoplastic polymer may be recited in terms of the weight % of the pendent functional moiety based on the total weight of the functionalized polymer. In one or more embodiments, the functionalized thermoplastic polymer may include at least 0.2% by weight, in other embodiments at least 0.4% by weight, in other embodiments at least 0.6% by weight, and in other embodiments at least 1.0 weight % functionalization. In these or other embodiments, the functionalized thermoplastic polymers may include less than 5% by weight, in other embodiments less than 3% by weight, and in other embodiments less than 2% by weight functionalization.

In one or more embodiments, where the functionalized thermoplastic polymer is a functionalized propylene-based polymer, it can be characterized by an MFR of from about 20 to about 2,000 dg/min, in other embodiments from about 100 to about 1,500 dg/min, and in other embodiments from about 150 to about 750 dg/min, (ASTM D-1238, 2.16 kg at 230° C.). In one or more embodiments, where the functionalized thermoplastic polymer is a functionalized ethylene-based polymer, it can be characterized by a melt flow index of from about 0.2 to about 2,000 dg/min, in other embodiments from about 1 to about 1,000 dg/min, and in other embodiments from about 5 to about 100 dg/min per ASTM D-1238 at 190° C. and 2.16 kg load.

Functionalized thermoplastic polymers are commercially available. For example, maleated propylene-based polymers may be obtained under the tradenames Orevac™ CA100 (Arkema) FUSABOND™ Md511D (DuPont), POLYBOND™ 3200 or 4000 (Chemtura), EXXELOR™ PO1020 (ExxonMobil), or EPOLENE™ (Eastman).

Thermoplastic polymers containing isocyanato groups may be prepared by grafting moieties, such as 3-isoprenyl-alpha, alpha-dimethylbenzene isocyanate to a thermoplastic polymer. These functionalized polymers and methods for preparing are disclosed in U.S. Publication No. 2001/0030045 and WO 99/50323.

Oils/Extenders

In one or more embodiments, the thermoplastic vulcanizates may include a mineral oil, a synthetic oil, or a combination thereof These oils may also be referred to as plasticizers or extenders. Mineral oils may include aromatic, naphthenic, paraffinic, and isoparaffinic oils. In one or more embodiments, the mineral oils may be treated or untreated. Useful mineral oils can be obtained under the tradename SUNPAR™ (Sun Chemicals). Others are available under the name PARALUX™ (Chevron).

In one or more embodiments, synthetic oils include polymers and oligomers of butenes including isobutene, 1-butene, 2-butene, butadiene, and mixtures thereof. In one or more embodiments, these oligomers can be characterized by a number average molecular weight ($M_n$) of from about 300 g/mole to about 9,000 g/mole, and in other embodiments from about 700 g/mole to about 1,300 g/mole. In one or more embodiments, these oligomers include isobutenyl mer units. Exemplary synthetic oils include polyisobutylene, poly (isobutylene-co-butene), and mixtures thereof. In one or more embodiments, synthetic oils may include polylinear α-olefins, poly-branched α-olefins, hydrogenated polyalphaolefins, and mixtures thereof.

In one or more embodiments, the synthetic oils include synthetic polymers or copolymers having a viscosity in excess of about 20 cp, in other embodiments in excess of about 100 cp, and in other embodiments in excess of about 190 cp, where the viscosity is measured by a Brookfield viscometer according to ASTM D-4402 at 38° C. In these or other embodiments, the viscosity of these oils can be less than 4,000 cp and in other embodiments less than 1,000 cp.

Useful synthetic oils can be commercially obtained under the tradenames Polybutene™ (Soltex; Houston, Tex.), and Indopol™ (Innouvene). White synthetic oil is available under the tradename SPECTRASYN™ (ExxonMobil), formerly SHF Fluids (Mobil) and Elevast™ (ExxonMobil). Oils described in U.S. Pat. No. 5,936,028 may also be employed. It is believed that synthetic oils may provide enhanced low temperature performance. Also, high temperature performance may be enhanced based upon molecular structure.

In one or more embodiments, the extender oils may include organic esters, alkyl ethers, or combinations thereof including those disclosed in U.S. Pat. Nos. 5,290,866 and 5,397,832, which are incorporated herein by reference. In one or more embodiments, the organic esters and alkyl ether esters may have a molecular weight that is generally less than about 10,000. In one or more embodiments, suitable esters include monomeric and oligomeric materials having an average molecular weight of below about 2,000 and in other embodiments below about 600. In one or more embodiments, the esters may be compatible or miscible with both the polyalphaolefin and rubber components of the composition; i.e., they may mix with other components to form a single phase. In one or more embodiments, the esters include aliphatic mono- or diesters, or alternatively oligomeric aliphatic esters or alkyl ether esters. In one or more embodiments, the thermoplastic vulcanizates are devoid of polymeric aliphatic esters and aromatic esters, as well as phosphate esters.

Other Constituents

In addition to the rubber, thermoplastic resins, and optional processing additives, the thermoplastic vulcanizates of the invention may optionally include reinforcing and non-reinforcing fillers, antioxidants, stabilizers, rubber processing oil, lubricants, anti-blocking agents, anti-static agents, waxes, foaming agents, pigments, flame retardants and other processing aids known in the rubber compounding art. These additives can comprise up to about 50 weight % of the total composition. Fillers and extenders that can be utilized include conventional inorganics such as calcium carbonate, clays, silica, talc, titanium dioxide, carbon black and the like.

Fibers

In one or more embodiments, the fibers, which may also be referred to as chopped fibers, include natural and synthetic fibers, and may include organic and inorganic fibers. Exemplary organic fibers include polyester, polyaramid, polyethylene naphthalate (PEN), polyester-polyacrylate, polyvinylchloride, polypropylene, polyphenylene sulfide, polyetherimide, polyamide, polyimide or cellulose fibers. Exemplary inorganic fibers include glass, steel, boron, carbon or wollastonite fibers.

Suitable polyaramid fibers are commercially available under the tradename Twaron™ (Teijin Twaran B.V.). Suitable polyester-polyacrylate fibers are commercially available under the tradename Vectra™ (Celanese). Suitable polyester fibers are commercially available under the tradename INVISTA™ F211 (Invista).

In one or more embodiments, the fibers may be characterized by a length of at least 1.5 mm, in other embodiments at least 3 mm, in other embodiments at least 4.5 mm, and in other embodiments at least 6 mm. In these or other embodiments, the fibers may be characterized by a length of less than 12 mm, in other embodiments less than 8 mm, in other embodiments less than 7 mm, and in other embodiments less than 5 mm.

In one or more embodiments, the fibers may be characterized by a diameter of at least 5 μm, in other embodiments at least 10 µm, in other embodiments at least 20 µm, and in other embodiments at least 30 µm. In these or other embodiments, the fibers may be characterized by a diameter of less than 70 µm, in other embodiments less than 60 µm, in other less than 50 µm, and in other embodiments less than 40 µm.

In one or more embodiments, the fibers employed in the present invention may be characterized by an aspect ratio of at least 1 (sphere), in other embodiments at least 10, and in other embodiments at least 50, and in other embodiments at least 100. In these or other embodiments, the fibers may be characterized by an aspect ratio of less than 1000, in other embodiments less than 750, and in other embodiments less than 500.

In one or more embodiments, the fibers employed in the present invention may be treated prior to inclusion into the thermoplastic vulcanizate. Treated fibers are disclosed in WO 2005/021643 A1 and U.S. Publ. No. 2006/0186583. In particular embodiments, the fibers are treated with resorcinol-formaldehyde or vinyl pyridine latexes. In these or other embodiments, epoxy or isocyanate treatments may be employed. In one or more embodiments, the fibers employed in practicing the present invention include untreated fiber.

Methylene Acceptor

In one or more embodiments, methylene acceptors include those compounds that are capable of reacting with a methylene donor to form a methylene bridge.

In particular embodiments, the methylene acceptor includes a phenol, which includes hydroxylated derivatives of arenes and equivalent compounds. Specific examples include monophenols, such as hydroxybenzene, bisphenols, polyphenols (polyhydroxyarenes), substituted phenols such as alkylphenols or aralkylphenols, for example bisphenols, diphenylolpropane, diphenylolmethane, naphthols, cresol, t-butylphenol, octylphenol, nonylphenol, xylenol, resorcinol, or analogous compounds.

In other embodiments, the methylene acceptor includes a phenolic resin. Useful phenolic resins include novolac resins (a.k.a. novolak resins), which are also referred to as two-stage resins. Novolac resins are formed from an acid-catalyzed condensation reaction between excess phenol and an aldehyde, particularly formaldehyde. Resorcinol-novolac resins include those novolac resins that include the acid-catalyzed reaction product of resorcinol and an aldehyde.

Useful methylenen acceptors include those commercially available under the tradename P-170™ Resin (Akrochem), Penacolite™ Resin B-16-S or B-21-S (Indspec), and SRF 1501™ (SI GROUP).

Methylene Donor

In one or more embodiments, methylene donors include those compounds that are capable of reacting with a methylene acceptor to form a methylene bridge.

Examples of methylene donors include hexamethylenetetramine (HMT), hexamethoxymethylmelamine (HMMM or H3M), hexaethoxymethylmelamine, formaldemelamine derivatives, or mixtures of these compounds. As is known in the art, the methylene donor can be delivered in conjunction with an inert carrier such as silica.

Useful methylene donors include those commercially available under the tradename CYREZ™ 964 (Cytec), which is a 65% active hexamethylenetetramine on hydrated amorphous silica.

Hydrolysis Stabilizer

In one or more embodiments, the thermoplastic phase of the thermoplastic vulcanizates of this invention may include a hydrolysis stabilizer. In one or more embodiments, hydrolysis stabilizers include those compounds that are believed to protect against hydrolysis.

Exemplary hydrolysis stabilizers include aromatic carbodiimides, such as those commercially available under the tradename Stabaxol P™ (Rhein Chemie/Lanxess).

Amounts

In one or more embodiments, the thermoplastic vulcanizate feedstock employed to make the fiber-reinforced thermoplastic vulcanizates of this invention may contain a sufficient amount of the rubber to form rubbery compositions of matter. The skilled artisan will understand that rubbery compositions of matter include those that have ultimate elongations greater than 100%, and that quickly retract to 150% or less of their original length within about 10 minutes after being stretched to 200% of their original length and held at 200% of their original length for about 10 minutes, where these values are determined prior to inclusion of the fiber reinforcement.

Thus, in one or more embodiments, the fiber-reinforced thermoplastic vulcanizates can include at least about 25% by weight, in other embodiments at least about 45% by weight, in other embodiments at least about 65% by weight, and in other embodiments at least about 75% by weight of rubber (i.e., dynamically-vulcanized rubber) based upon the total weight of the thermoplastic vulcanizates. In these or other embodiments, the amount of rubber within the fiber-reinforced thermoplastic vulcanizates can be from about 15 to about 90% by weight, in other embodiments from about 45 to about 85% by weight, and in other embodiments from about 60 to about 80% by weight, based on the entire weight of the rubber and thermoplastic combined.

In one or more embodiments, the amount of thermoplastic polymer (i.e., uncured polymer within the thermoplastic phase) within the fiber-reinforced thermoplastic vulcanizates can be from about 10% to about 85% by weight, in other embodiments from about 10% to about 40% by weight, and in other embodiments from about 12% to about 30%, based on the entire weight of the rubber and thermoplastic combined. In these or other embodiments, the amount of thermoplastic polymer within the fiber-reinforced thermoplastic vulcanizates may be from about 25 to about 250 parts by weight, in other embodiments from about 50 to about 150 parts by weight, and in other embodiments from about 60 to about 100 parts by weight thermoplastic polymer per 100 parts weight rubber.

With respect to the thermoplastic phase, the amount of functionalized plastic present within the phase may vary. In one or more embodiments, the fiber-reinforced thermoplastic vulcanizate includes at least 4% by weight, in other embodiments at least 6% by weight, in other embodiments at least 7% by weight, in other embodiments at least 8% by weight, in other embodiments at least 10% by weight, and in other embodiments at least 12% by weight functionalized plastic based upon the entire weight of the fiber-reinforced thermoplastic vulcanizate. In these or other embodiments, the fiber-reinforced thermoplastic vulcanizate includes less than 20% by weight, in other embodiments less than 18% by weight, in other embodiments less than 16%, and in other embodiments less than 15% by weight functionalized plastic based upon the entire weight of the fiber-reinforced thermoplastic vulcanizate. In particular embodiments, 100% by weight of the thermoplastic phase includes the functionalized plastic. In other embodiments, a functionalized plastic is not employed, and therefore the plastic phase is devoid or substantially devoid of a functionalized plastic.

With respect to the oil, the fiber-reinforced thermoplastic vulcanizate may include from about 25 to about 250 parts by weight, or from about 50 to about 150 parts by weight, or from about 75 to about 130 parts by weight, of extender oil per 100 parts rubber. The quantity of extender oil added may depend upon the properties desired, with the upper limit depending upon the compatibility of the particular oil and blend ingredients; this limit is exceeded when excessive exuding of extender oil occurs. The amount of extender oil may depend, at least in part, upon the type of rubber. High viscosity rubbers are more highly oil extendable.

With respect to the reaction product between the methylene donor and the methylene acceptor, reference can be made to the amount of the methylene donor and the amount of the methylene acceptor introduced to the thermoplastic vulcanizate.

In one or more embodiments, at least about 0.3%, in other embodiments at least about 0.6% by weight, in other embodiments at least about 0.9% by weight, and in other embodiments at least about 1.2% by weight methylene donor, based upon the entire weight of the fiber-reinforced thermoplastic vulcanizate, is employed. In these or other embodiments, less than 4% by weight, in other embodiments, less than 3.5% by weight, in other embodiments, less than 2% by weight, and in other embodiments, less than 1.8% by weight methylene donor, based upon the entire weight of the fiber-reinforced thermoplastic vulcanizate, is employed.

In one or more embodiments, at least about 0.5%, in other embodiments at least about 1.0% by weight, in other embodiments at least about 1.5% by weight, and in other embodiments at least about 2.0% by weight methylene acceptor, based upon the entire weight of the fiber-reinforced thermoplastic vulcanizate, is employed. In these or other embodiments, less than 6% by weight, in other embodiments, less than 5% by weight, in other embodiments, less than 3% by weight, and in other embodiments, less than 2% by weight methylene acceptor, based upon the entire weight of the fiber-reinforced thermoplastic vulcanizate, is employed.

In one or more embodiments, the fiber-reinforced thermoplastic vulcanizates of the present invention include at least 1% by weight, in other embodiments at least 2.5% by weight, in other embodiments at least 5% by weight, in other embodiments at least 10% by weight, in other embodiments at least 15% by weight, and in other embodiments at least 20% by weight fiber, based upon the entire weight of the fiber-reinforced thermoplastic vulcanizates. In these or other embodiments, the fiber-reinforced thermoplastic vulcanizates include up to 50% by weight, in other embodiments up to 40% by weight, in other embodiments up to 32% by weight, in other embodiments up to 28% by weight, and in other embodiments up to 24% by weight fiber based upon the entire weight of the fiber-reinforced thermoplastic vulcanizates.

Fillers, such as carbon black, clay, talc, or calcium carbonate may be added in amount from about 1 to about 250 parts by weight, in other embodiments from about 10 to about 150 parts by weight, and in other embodiments from about 25 to about 50 parts by weight, per 100 parts by weight of rubber. The amount of carbon black that can be used may depend, at least in part, upon the type of carbon black and the amount of extender oil that is used.

Preparation of TPV Feedstock

As is known in the art, thermoplastic vulcanizates may be prepared by dynamic vulcanization of the rubber in the presence of a non-vulcanizing thermoplastic polymer. Once dynamic vulcanization is effected, the fiber, methylene donor, methylene acceptor, and optionally functionalized and/or unfunctionalized plastic are introduced to the thermoplastic vulcanizate feedstock. In other embodiments, at least a portion of one or more of the fiber, methylene donor, methylene acceptor, and/or functionalized plastic may be added before dynamic vulcanization.

Dynamic vulcanization includes a vulcanization or curing process for a rubber within a blend with a thermoplastic resin, where the rubber may be crosslinked or vulcanized under conditions of high shear at a temperature above the melting point of the thermoplastic. In one embodiment, the rubber can be simultaneously crosslinked and dispersed as fine particles within the thermoplastic matrix, although other morphologies may also exist.

In one or more embodiments, dynamic vulcanization can be effected by employing a continuous process. Continuous processes may include those processes where dynamic vulcanization of the rubber is continuously achieved, thermoplastic vulcanizate product is continuously removed or collected from the system, and/or one or more raw materials or ingredients are continuously fed to the system during the time that it may be desirable to produce or manufacture the product.

In one or more embodiments, continuous dynamic vulcanization can be effected within a continuous mixing reactor, which may also be referred to as a continuous mixer. Continuous mixing reactors may include those reactors that can be continuously fed ingredients and that can continuously have product removed therefrom. Examples of continuous mixing reactors include twin screw or multi-screw extruders (e.g., ring extruder). Methods and equipment for continuously preparing thermoplastic vulcanizates are described in U.S. Pat. Nos. 4,311,628, 4,594,390, 5,656,693, 6,147,160, and 6,042,260, as well as WO 2004/009327 A1, which are incorporated herein by reference for purpose of U.S. patent practice, although methods employing low shear rates can also be used. The temperature of the blend as it passes through the various barrel sections or locations of a continuous reactor can be varied as is known in the art. In particular, the temperature within the cure zone may be controlled or manipulated according to the half-life of the curative employed.

In one or more embodiments, dynamic vulcanization of the rubber occurs in the presence of functionalized plastic. In other words, the rubber and the functionalized plastic (as well as other ingredients that may be desirable) are mixed and masticated above the melting temperature of the plastic, and dynamic vulcanization of the rubber is affected during this mixing period. In particular embodiments, oil is introduced to the mixture. In certain embodiments, the addition of sufficient oil allows for the achievement of particular advantageous properties of the thermoplastic vulcanizate.

The thermoplastic vulcanizate feedstock prepared according to the present invention may be dynamically vulcanized by employing conventional cure systems. Examples include phenolic resin cure systems, silicon-containing cure systems, and peroxide cure systems (i.e., free-radical cure systems).

Useful phenolic cure systems are disclosed in U.S. Pat. Nos. 2,972,600, 3,287,440, 5,952,425 and 6,437,030. In one or more embodiments, phenolic resin curatives include resole resins, which can be made by the condensation of alkyl substituted phenols or unsubstituted phenols with aldehydes, preferably formaldehydes, in an alkaline medium or by condensation of bi-functional phenoldialcohols. The alkyl substituents of the alkyl substituted phenols may contain 1 to about 10 carbon atoms. Dimethylolphenols or phenolic resins, substituted in para-positions with alkyl groups containing 1 to about 10 carbon atoms may be employed. In one embodiment, a blend of octylphenol-formaldehyde and nonylphenol-formaldehyde resins are employed. The blend includes from about 25 to about 40% by weight octylphenol-formaldehyde and from about 75 to about 60% by weight nonylphenol-formaldehyde, in other embodiments, the blend includes from about 30 to about 35 weight percent octylphenol-formaldehyde and from about 70 to about 65 weight % nonylphenol-formaldehyde. In one embodiment, the blend includes about 33% by weight octylphenol-formaldehyde and about 67% by weight nonylphenol-formaldehyde resin, where each of the octylphenol-formaldehyde and nonylphenol-formaldehyde include methylol groups. This blend can be solubilized in paraffinic oil at about 30% solids without phase separation.

Useful phenolic resins may be obtained under the tradenames SP-1044, SP-1045 (Schenectady International; Schenectady, N.Y.), which may be referred to as alkylphenol-formaldehyde resins. SP-1045 is believed to be an octylphenol-formaldehyde resin that contains methylol groups. The SP-1044 and SP-1045 resins are believed to be essentially free of halogen substituents or residual halogen compounds. By essentially free of halogen substituents, it is meant that the synthesis of the resin provides for a non-halogenated resin that may only contain trace amounts of halogen containing compounds.

An example of a phenolic resin curative includes that defined according to the general formula

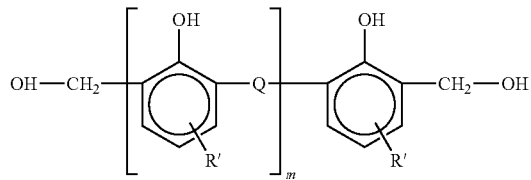

where Q is a divalent radical selected from the group consisting of —CH$_2$—, —CH$_2$—O—CH$_2$—; m is zero or a positive integer from 1 to 20 and R' is an organic group. In one embodiment, Q is the divalent radical —CH$_2$—O—CH$_2$—, m is zero or a positive integer from 1 to 10, and R' is an organic group having less than 20 carbon atoms. In other embodiments, m is zero or a positive integer from 1 to 10 and R' is an organic radical having between 4 and 12 carbon atoms.

In one or more embodiments, the phenolic resin is used in conjunction with a cure accelerator such as stannous chloride, and metal oxide such as zinc oxide, which is believed to function as a scorch retarder and acid scavenger and/or polymer stabilizer.

In one or more embodiments, the phenolic resin may be employed in an amount from about 2 to about 6 parts by weight, in other embodiments from about 3 to about 5 parts by weight, and in other embodiments from about 4 to about 5 parts by weight per 100 parts by weight of rubber. A complementary amount of stannous chloride may include from about 0.5 to about 2.0 parts by weight, in other embodiments from about 1.0 to about 1.5 parts by weight, and in other embodiments from about 1.2 to about 1.3 parts by weight per 100 parts by weight of rubber. In conjunction therewith, from about 0.1 to about 6.0 parts by weight, in other embodiments from about 1.0 to about 5.0 parts by weight, and in other embodiments from about 2.0 to about 4.0 parts by weight of zinc oxide may be employed. In one or more embodiments, the olefinic rubber employed with the phenolic curatives includes diene units deriving from 5-ethylidene-2-norbornene.

Free-radical cure agents include peroxides such as organic peroxides. Examples of organic peroxides include, but are not limited to, di-tert-butyl peroxide, dicumyl peroxide, t-butylcumyl peroxide, α,α-bis(tert-butylperoxfy) diisopropyl benzene, 2,5-dimethyl-2,5-di(t-butylperoxy)hexane (DBPH), 1,1-di(tert-butylperoxy)-3,3,5-trimethyl cyclohexane, n-butyl-4-4-bis(tert-butylperoxy)valerate, benzoyl peroxide, lauroyl peroxide, dilauroyl peroxide, 2,5-dimethyl-2,5-di(tert-butylperoxy)hexyne-3, and mixtures thereof. Also, diaryl peroxides, ketone peroxides, peroxydicarbonates, peroxyesters, dialkyl peroxides, hydroperoxides, peroxyketals and mixtures thereof may be used. Others include azo initiators including Luazo™ AP (ARCHEMA). Useful peroxides and their methods of use in dynamic vulcanization of thermoplastic vulcanizates are disclosed in U.S. Pat. No. 5,656,693, which is incorporated herein by reference for purpose of U.S. patent practice. In certain embodiments, cure systems such as those described in U.S. Pat. No. 6,747,099, U.S. Application Publication No. 20040195550, and WIPO Publication Nos. 2002/28946, 2002/077089, and 2005/092966, may also be employed.

In one or more embodiments, the free-radical cure agent may be employed in conjunction with one or more coagents. Coagents may include high-vinyl polydiene or polydiene copolymer, triallylcyanurate, triallyl isocyanurate, triallyl phosphate, sulfur, N,N'-m-phenylenedimaleimide, N,N'-p-phenylenedimaleimide, divinyl benzene, trimethylol propane trimethacrylate, tetramethylene glycol diacrylate, trifunctional acrylic ester, dipentaerythritolpentacrylate, polyfunctional acrylate, retarded cyclohexane dimethanol diacrylate ester, polyfunctional methacrylates, acrylate and methacrylate metal salts, multi-functional acrylates, multi-functional methacrylates, or oximers such as quinone dioxime. Combinations of these coagents may be employed. For example, combinations of high-vinyl polydienes and α-β-ethylenically unsaturated metal carboxylates are useful, as disclosed in U.S. Ser. No. 11/180,235. Coagents may also be employed as neat liquids or together with a carrier. For example, the multi-functional acrylates or multi-functional methacrylates together with a carrier are useful, as disclosed in U.S. Ser. No. 11/246,773. Also, the curative and/or coagent may be premixed with the plastic prior to formulation of the thermoplastic vulcanizate, as described in U.S. Pat. No. 4,087,485.

The skilled artisan will be able to readily determine a sufficient or effective amount of curative and/or coagent to be employed without undue calculation or experimentation. Those skilled in the art appreciate that the amount of curative employed may vary based upon the chemical nature of the peroxide and/or coagent employed. In these or other embodiments, the amount of curative employed may vary based upon the type of rubber employed, as well as the cross-linkable units present within the rubber.

Silicon-containing cure systems may include silicon hydride compounds having at least two SiH groups. Silicon hydride compounds that are useful in practicing the present invention include, but are not limited to, methylhydrogenpolysiloxanes, methylhydrogendimethylsiloxane copolymers, alkylmethyl-co-methylhydrogenpolysiloxanes, bis(dimethylsilyl)alkanes, bis(dimethylsilyl)benzene, and mixtures thereof.

Useful catalysts for hydrosilylation include, but are not limited to, transition metals of Group VIII. These metals include, but are not limited to, palladium, rhodium, and platinum, as well as complexes of these metals. Useful silicon-containing curatives and cure systems are disclosed in U.S. Pat. No. 5,936,028.

In one or more embodiments, the silane-containing compounds may be employed in an amount from about 0.5 to about 5.0 parts by weight, in other embodiments from about 1.0 to about 4.0 parts by weight, and in other embodiments from about 2.0 to about 3.0 parts by weight per 100 parts by weight of rubber. A complementary amount of catalyst may include from about 0.5 to about 20.0 parts, in other embodiments from about 1.0 to about 5.0 parts, and in other embodiments from about 1.0 to about 2.0 parts of metal per million parts by weight of the rubber. In one or more embodiments, the olefinic rubber employed with the hydrosilylation curatives includes diene units deriving from 5-vinyl-2-norbornene.

Fiber Incorporation

As noted above, in one or more embodiments, the fiber, methylene donor and methylene acceptor, (and optionally functionalized and/or unfunctionalized plastic) are introduced to the thermoplastic vulcanizate after dynamic vulcanization. Reference to "after dynamic vulcanization" refers to that point in time after the onset of phase inversion between the rubber and plastic (i.e., at that point in time where the plastic becomes a continuous phase within the thermoplastic vulcanizate). As those skilled in the art appreciate, and as may occur in one or more embodiments of the present invention, the initial introduction of rubber and thermoplastic resin forms a blend or mixture where the rubber is the major component (e.g., the rubber may include the major volume fraction of the mixture). In one or more embodiments, the rubber is a continuous phase of the mixture prior to dynamic vulcanization and the thermoplastic resin is a discontinuous phase of the mixture prior to dynamic vulcanization. As noted above, dynamic vulcanization causes a phase inversion where the plastic becomes a continuous phase within the thermoplastic vulcanizate feedstock.

In particular embodiments, the introduction of the fiber, methylene donor, methylene acceptor, and optionally the functionalized or unfunctionalized plastic occurs via a downstream feeder within a continuous process whereby the thermoplastic vulcanizate remains within a molten state between dynamic vulcanization and the introduction of the functionalized thermoplastic. Similar processes are described in International Application No. PCT/US04/30517 (International Publication No. WO 2005/028555), which is incorporated herein by reference for purpose of U.S. patent practice. In particular embodiments, it may be advantageous to introduce additional oil after dynamic vulcanization in order to facilitate manufacture and processing of the thermoplastic vulcanizate. In particular embodiments, certain advantageous properties may be achieved by adding oil with the fiber, methylene donor and methylene acceptor. The oil may be heated to achieve further enhancements in incorporation and final preparation of the thermoplastic vulcanizate.

In other embodiments, the thermoplastic vulcanizate feedstock may be cooled below the melt temperature of the thermoplastic resins (e.g., solidified) and fabricated (e.g., pelletized) after dynamic vulcanization and then subsequently introduced to the fiber, methylene donor, methylene acceptor, and optionally the functionalized and/or unfunctionalized plastic. For example, the fiber, functionalized thermoplastic, methylene donor, methylene acceptor, and pellets of the thermoplastic vulcanizate feedstock may be introduced and melt mixed within a reaction extruder above the melt temperature of the thermoplastic resins, but below the melt temperature (and in certain embodiments below the fiber distortion temperature) of the fiber. An exemplary temperature would be between 170° C. and 220° C. In these embodiments, it may be advantageous to introduce additional oil to facilitate manufacture and processing of the thermoplastic vulcanizate and, in particular embodiments, achieve certain advantageous thermoplastic vulcanizate properties. Likewise, it may be advantageous to add additional unfunctionalized plastic to facilitate incorporation of the fibers and/or alter the ultimate properties of the thermoplastic vulcanizate.

In certain embodiments, when incorporating the fiber, it may be advantageous to employ mixing techniques that are less aggressive than employed when manufacturing the thermoplastic vulcanizate feedstock (i.e., dynamic vulcanization) For example, twin-screw extruders including less lobes (e.g., 2 instead of 3), or a ring extruder may be employed in an effort to avoid or reduce shear degradation.

Manufacture of Shaped Articles

The fiber-reinforced thermoplastic vulcanizates according to the present invention can be shaped by extrusion using conventional dies. In one or more embodiments, the fibers within the thermoplastic vulcanizate can be aligned to produce thermoplastic vulcanizates exhibiting anisotropic properties. In particular embodiments, fiber alignment may take place during the shaping of the fiber-reinforced thermoplastic vulcanizate. In one or more embodiments, fiber alignment takes place before the ultimate manufacture of the article.

In certain embodiments, a robotic extrusion assembly, as described in U.S. Pat. No. 5,336,349 to Cornils, et al., the disclosure of which is fully incorporated herein by reference, can be used. Similar techniques are disclosed in WO 2005/021643.

In one embodiment, referring to FIG. 1, the thermoplastic vulcanizate composition according to this invention is fed via an extruder 1 and a heated pressure hose 2 to a heated extrusion die 3. The extrusion die is guided by a robot 4, and the elastomer is extruded and laid by means of the extrusion die onto a preferably pre-shaped supplementary surface 5. The die is guided by an automatic handling device and the elastomer is extruded and simultaneously shaped. In one embodiment, the extrusion die 3 is a moving mandrel expanding die as disclosed in L. A. Goettler, A. J. Lambright, R. I. Leib and P. J. DiMauro at the meeting of the Rubber Division of the American Chemical Society on 7 to 10 Oct. 1980 in Detroit, Mich. With this assembly acute bends are formed by offsetting the inner and outer part of the mandrel expansion extrusion die 3 and wider bends are formed by the movement of the robotic handling unit 4.

The movement of the robotic handling until 4 may be aligned with the off-setting of the inner die 3 in order to obtain extrudates 6 having constant wall thicknesses on the inside and on the outside of the bends.

For instance, the excessive movement of the robotic handling unit 4 would generally result in a bend that is stretched on the outside (wide radius) and compressed on the inside (narrow radius). Consequently, the wall thickness of the wall inside the bend would be thicker compared to the thinner wall outside the bend. Off-setting of the inner or outer part of the die counteracts the formation of different wall thicknesses if the annular die passage is narrow on the inside and wide on the outside of the bend.

In order to prevent the extrudate 6 from coming in contact with the extruder 1, the extrusion die 3 or the handling unit 4, the outlet orifice of the mandrel die 3 that is arranged at the handling unit 4 is oriented into a direction away from the extruder/handling unit 1/4.

In one or more embodiments, common screw extruders comprising external cylinder heaters may be used, that plasticize the thermoplastic elastomeric material to the necessary processing temperature. The molten elastomer is supplied from the discharging zone of the extruder to the extrusion die via a flexible high pressure hose, also provided with a suitable heater, which hose must be capable of resisting the high pressures corresponding to the viscosity of the thermoplastic elastomer. The mandrel extrusion die is also heated by means of a suitable heater to the necessary processing temperature of the elastomer and is guided by means of a robot. Depending on the needs the pressure hose may have a length of from about 20 cm to about 6.0 m, and a diameter of from about 5 mm to 50 mm.

To produce a shaped extrudate, the dry blend is typically processed in a long-barrel extruder having a barrel length/diameter (L/D) ratio in the range from about 24:1 to about 60:1, fitted with a screw that provides a compression ratio greater than about 2.5:1, and substantially constant pressure on the melt within the barrel, and preferably fitted in the entry zone of a grooved barrel section. In one embodiment, the diameter of said barrel is in the range from about 2.54 cm to about 15.24 cm. The extrudate may also be produced in a tandem or twin screw extruder.

For the extrusion process according to the present invention any extrusion die can be used. In one embodiment, an extrusion die that facilitates the control of the fiber orientation within the extrudate is used. A mandrel expanding extrusion die comprising an inner and an outer die that can be off-set in order to shape the extrudate can also be used. The obtained parisons (extrudates) of present invention having a high melt strength based on the morphology of the thermoplastic elastomer used and also due to the presence and orientation of the short fibers which is sufficient for a parison manipulation by modern blow-molding techniques. Typical extrusion temperatures are from about 150° C. to about 250° C., preferably from about 180° C. to about 230° C.

Articles of Manufacture

The fiber-reinforced thermoplastic vulcanizates of the present invention are particularly useful for preparing articles that demonstrate desirable anisotropic properties upon fiber alignment. Exemplary articles include hoses such as those used in the manufacture of automobiles and the like. These hoses are not necessarily limited and may include those designed to transmit fluids or gases. In particular embodiments, these hoses include coolant hoses.

Product Characteristics

In one or more embodiments, the fiber-reinforced thermoplastic vulcanizates of certain embodiments of the present invention may be characterized by a heat distortion temperature of at least 70° C., in other embodiments at least 80° C., in other embodiments at least 90° C., and in other embodiments at least 99° C., where the heat distortion temperature is determined from dynamic mechanical thermal analysis per methods established by Takemori, SPE ANTEC, 24, 216 (1978) and Scobbo, et al., SPE ANTEC, 41, 4024 (1995).

In one or more embodiments, the fiber-reinforced thermoplastic vulcanizate of certain embodiments of the present invention may be characterized by a 10% modulus, per ISO 37, that is at least 10%, in other embodiments at least 15%, in other embodiments at least 20%, in other embodiments at least 25%, and in other embodiments at least 30% greater than the 10% modulus of similar fiber-reinforced thermoplastic vulcanizates that do not include the combination or reaction product of a methylene donor and methylene acceptor.

In one or more embodiments, the fiber-reinforced thermoplastic vulcanizate of certain embodiments of the present invention may be characterized by a maximum strain, per ISO 37, that is at least 10%, in other embodiments at least 15%, in other embodiments at least 20%, in other embodiments at least 25%, and in other embodiments at least 30% greater than the maximum strain of similar fiber-reinforced thermoplastic vulcanizates that do not include the combination or reaction product of a methylene donor and methylene acceptor.

Specific Embodiments

A thermoplastic vulcanizate comprising a dynamically-cured rubber, and a thermoplastic phase, and optionally a functionalized thermoplastic resin, where the thermoplastic phase includes fiber and the combination or reaction product of a methylene donor and a methylene acceptor.

The embodiment of paragraph 144, where the thermoplastic phase includes a functionalized thermoplastic.

The embodiment of paragraphs 144-145, where the functionalized thermoplastic resin is a carbonyl-containing thermoplastic resin selected from the group consisting of maleic anhydride functionalized polypropylene.

The embodiment of paragraphs 144-146, where the thermoplastic vulcanizate further includes a hydrolysis stabilizer.

The embodiment of paragraphs 144-147, where the methylene acceptor is a novolac resin or a resorcinol-formaldehyde novolac resin.

The embodiment of paragraphs 144-148, where the methylene donor is selected from the group consisting of hexamethylenetetramine, hexamethoxymethylmelamine, and hexaethoxymethylmelamine.

The embodiment of paragraphs 144-149, where the fiber includes polyester fibers.

The embodiment of paragraphs 144-150, where the fiber includes polyester fibers.

The embodiment of paragraphs 144-151, where the fibers have a length of less than 12 mm.

The embodiment of paragraphs 144-152 where the thermoplastic vulcanizate includes at least 1% and up to 50% by weight fiber based upon the total weight of the fiber-reinforced thermoplastic vulcanizate.

The embodiment of paragraphs 144-153 where the fibers have a diameter of less than 70 μm.

The embodiment of paragraphs 144-154, where fibers are aligned.

A method of forming a fiber-reinforced thermoplastic vulcanizate, the method comprising of dynamically curing a rubber while the rubber is undergoing mixing with a thermoplastic resin to form a thermoplastic vulcanizate feedstock, and introducing fiber, a methylene donor, a methylene acceptor, and optionally, a functionalized thermoplastic with the thermoplastic vulcanizate feedstock to form the fiber-reinforced thermoplastic vulcanizate.

The embodiment of paragraph 156, where a functionalized thermoplastic is introduced with the thermoplastic vulcanizate stock or with the fiber-reinforced thermoplastic vulcanizate.

The embodiment of paragraphs 156-157, where said step of introducing includes mixing the fiber, the methylene donor, the methylene acceptor, and the functionalized thermoplastic with the thermoplastic vulcanizate feedstock at a temperature above the melt temperature of the thermoplastic vulcanizate feedstock, but below the distortion temperature of the fiber.

The embodiment of paragraphs 156-158, where the mixing occurs at a temperature of from about 170° C. to about 220° C.

The embodiment of paragraphs 156-159 where said step of introducing includes introducing at least 1% and up to 50% by weight fiber based upon the total weight of the reinforced thermoplastic vulcanizate.

The embodiment of paragraphs 156-160 where said step of introducing includes introducing at least 4 and up to 20% by weight functionalized thermoplastic resin based upon the total weight of the fiber-reinforced thermoplastic vulcanizate.

The embodiment of paragraphs 156-161, where said step of introducing includes introducing at least 0.3 and up to 4% by weight methylene donor based upon the total weight of the fiber-reinforced thermoplastic vulcanizate.

The embodiment of paragraphs 156-162, where said step of introducing includes introducing at least 0.5 and up to 6% by weight methylene acceptor based upon the total weight of the fiber-reinforced thermoplastic vulcanizate.

The embodiment of paragraphs 156-163, where further comprising the step of aligning the fibers within the thermoplastic vulcanizate.

The embodiments of paragraphs 156-164, where further comprising the step of introducing an unfunctionalized thermoplastic to the thermoplastic vulcanizate feedstock.

EXAMPLES

A thermoplastic vulcanizate feedstock was prepared by dynamically vulcanizing an elastomeric copolymer with a phenolic resin in the presence of stannous chloride ($SnCl_2$-$2H_2O$) and zinc oxide in the presence of a thermoplastic resin. Dynamic vulcanization was affected within large-scale, high-shear mixing equipment by employing conventional commercial techniques. Table 1 provides the ingredients and amounts that were employed.

The elastomeric copolymer was poly(ethylene-co-propylene-co-5-ethylidene-2-norbornene) characterized by having a diene content of about 3.9 weight %, a Mooney viscosity $ML_{(1+4)}$@125° C. of about 52 (oil extended), an intrinsic viscosity (dl/g) in decalin at 135° C. of about 4 dl/g, a weight average molecular weight of about 850 kg/mole, a number average molecular weight of about 170 kg/mole, an ethylene content of about 64 weight %, a paraffinic oil content of 75 phr (the parts by weight in Table I referring to the amount of rubber and paraffinic oil) and was obtained under the tradename V3666™ (ExxonMobil Corp). The phenolic resin was a resole-type resin, including a blend of octylphenol and nonylphenol formaldehyde dispersed in paraffinic oil. The 0.8 MFR polypropylene was obtained under the tradename PP534-1™ (ExxonMobil) and/or F008F™ (Sunoco). The 18 MFR polypropylene was obtained under the tradename F180A™ (Sunoco). The extender oil was a paraffinic oil obtained under the tradename Sunpar 150M™ (Sunoco). The filler was a clay filler obtained under the tradename Icecap K™ (Burgess). The black concentrate was a commercial blend including 40% carbon black and polypropylene, which obtained under the tradename 49974™ (Ampacet). The wax was obtained under the tradename 2709™ (Okerin).

TABLE I

| Material | % by Weight |
|---|---|
| Oil-Extended Rubber | 51.3 |
| Polypropylene (0.8 MFR) | 9.4 |
| Polypropylene (18 MFR) | 3.7 |
| Extender Oil | 17.7 |
| Filler | 12.3 |
| Phenolic Resin | 2.4 |
| Black Concentrate | 1.4 |
| Wax | 1.0 |
| Zinc Oxide | 0.6 |
| Stannous Chloride | 0.4 |

Samples 1-13

Portions of the thermoplastic vulcanizate feedstock prepared above were melt mixed with polyester fibers and other ingredients as provided in Table II. The amounts of the various ingredients that were melt mixed are provided in % by weight, based upon the total weight of the fiber-reinforced thermoplastic vulcanizate. Prior to introducing the components, the PET fiber was dried for 16 hours at 107° C., the nylon was dried for 16 hours at 80° C., and the thermoplastic vulcanizate feedstock was dried for 4 hours at 72° C. Mixing was accomplished as follows. The thermoplastic vulcanizate feedstock was heated to 200° C. within a brabender mixer operating at 100 rpm. The fibers and other ingredients were added. Mixing continued for 4 minutes, and then the fiber-reinforced thermoplastic vulcanizate, which was at about 215° C. at dump, was processed on an oil-heated, two-roll mill for two minutes at 204° C.

Milled sheets of about 2 mm thickness from the two-roll mill were cut to mold dimensions based upon the length and breadth dimensions of the mold cavity (which was about 110 mm×110 mm), and were compression molded for five minutes at 204° C. and cooled under pressure for eight minutes to 49° C. Testing was conducted "with" and "against" the direction of orientation of the fibers, which was consistent with the direction of flow on the mill (i.e. with) and 90° across the flow (i.e. against). The results of various tests are also provided in Table II.

The 0.8 MFR polypropylene was the same as was employed in preparing the feedstock. The nylon 12 was obtained under the tradename Grilamid L16LM™ (EMS Chemie). The polyester fibers (PET fibers) were cut fibers characterized by an average length of about 6 mm and obtained under the tradename Invista F211™ (INVISTA). The maleated polypropylene was obtained under the tradename Orevac CA100™ (Arkema) and was characterized by an MFR of about 10 dg/min (2.16 kg load at 190° C.), had a melt temperature of about 167° C., and included about 1% functionalization with maleic anhydride. The Methylene Donor was hexamethoxymethyl-melamine (HMMM). The Methylene Acceptor I was a resorcinol-novolac resin obtained under the tradename P-170™ (Akrochem). The Methylene Acceptor II was a Penacolite™ resin obtained under the tradename B-21-S™ (Indspec). The hydrolysis stabilizer was aromatic carbodiimide, obtained under the tradename Stabaxol P™ (Rhein Chemie).

Specific gravity was determined according to ASTM D-792. Shore hardness was determined according to ISO 868 with a fifteen-second time interval. 10% modulus, ultimate tensile strength, elongation at break (ultimate elongation), and maximum strain were determined according to ISO 37 at 23° C. (unless otherwise specified) at 50 mm per minute by using an Instron testing machine. Weight gain in IRM 903 oil was determined according to ASTM D-471 at 121° C. after 24 hours. LCR viscosity was determined according to ISO 11443 at 204° C. at 1200 $s^{-1}$.

TABLE II

| | Samples 1-13 | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| TPV Feedstock | 66 | 64 | 64 | 66 | 64 | 65 | 64 | 66 | 64 | 64 | 66 | 64 | 65 |
| Polypropylene (0.8 MFR) | | | | 12 | 12 | 12 | 12 | | | | 2.5 | 2.5 | 2.5 |
| Nylon 12 | | | | | | | | 12 | 12 | 12 | | | |
| PET Fiber | 22 | 21 | 21 | 22 | 21 | 21.5 | 21 | 10 | 10 | 10 | 22 | 21 | 21.5 |
| Maleated Polypropylene | 12 | 12 | 12 | | | | | 12 | 11 | 11 | 9.5 | 9.5 | 9.5 |
| Methylene Donor | | 2 | 1 | | 2 | 1 | 1 | | 1 | 2 | | 2 | 1 |
| Methylene Acceptor I | | 1 | 2 | | 1 | 0.5 | 2 | | 2 | 1 | | 1 | 0.5 |
| Test Results | | | | | | | | | | | | | |
| Specific Gravity | 1.033 | 1.038 | 1.036 | 1.033 | 1.028 | 1.026 | 1.035 | 0.991 | 0.997 | 0.998 | 1.032 | 1.033 | 1.034 |
| Hardness Shore A | 91 | 90 | 89 | 84 | 90 | 89 | 87 | 87 | 90 | 87 | 89 | 85 | 87 |
| Hardness Shore D | 38 | 41 | 40 | 32 | 41 | 42 | 39 | 36 | 38 | 36 | 38 | 38 | 39 |
| LCR Viscosity (Pa s) | 131 | — | — | 116 | 157 | 149 | 165 | 103 | — | — | — | — | — |
| Weight Gain (%) | 45 | 43 | 44 | 52 | 41 | 40 | 41 | 49 | 46 | 49 | — | — | — |
| With: | | | | | | | | | | | | | |
| 10% Modulus (MPa) | 9.86 | 9.32 | 7.64 | 5.18 | 8 | 8.15 | 6.37 | 6.17 | 6.12 | 5.56 | 11.53 | 9.11 | 9.98 |
| 50% Modulus (MPa) | — | 11.6 | — | — | 7.32 | -c | — | — | — | 8.05 | — | — | — |
| 100% Modulus (MPa) | — | — | — | — | — | — | — | — | — | — | — | — | — |
| UTS (MPa) | 11.65 | 17.3 | 14.2 | 5.6 | 11.13 | 12.32 | 7.16 | 7.38 | 9.58 | 8.79 | 12.73 | 17.19 | 18.51 |
| Ultimate Elongation (%) | 21 | 43 | 41 | 36 | 38 | 33 | 30 | 25 | 44 | 45 | 14 | 41 | 39 |
| Against: | | | | | | | | | | | | | |
| 10% Modulus (MPa) | 5.35 | 4.17 | 5.03 | 2.39 | 4.09 | 3.96 | 3.24 | 3.26 | 4.34 | 4.08 | 4.62 | 4.83 | 4.86 |
| 50% Modulus (MPa) | — | 5.44 | 8.02 | 3.8 | 5.82 | 5.74 | 4.22 | 4.37 | 5.38 | 5.56 | 6.69 | 6.25 | 7.23 |
| 100% Modulus (MPa) | — | — | — | 4.56 | — | — | — | — | — | — | — | — | — |
| UTS (MPa) | 7.13 | 6.88 | 8.46 | 4.81 | 6.3 | 6.17 | 4.51 | 4.4 | 5.97 | 5.95 | 6.69 | 7.74 | 6.94 |
| Ultimate Elongation (%) | 34 | 45 | 50 | 135 | 71 | 83 | 89 | 54 | 45 | 48 | 44 | 44 | 45 |

The data in Table II shows that the compositions of the present invention can indeed be used to produce fiber-reinforced thermoplastic vulcanizates demonstrating advantageous anisotropic properties. Notably, useful elongations in both the directions of fiber orientation and perpendicular to fiber orientation are obtained together with advantageous strength. As a result, it is predicted that hoses can be produced using the compositions of this invention that show advantageous burst strength and advantageous flexibility. Surprisingly, the inclusion of nylon seemed to show a negative influence on key properties.

Samples 14-29

Additional fiber-reinforced thermoplastic vulcanizate samples were prepared using similar thermoplastic vulcanizate feedstock and procedures as set forth in Samples 1-13 above. The ingredients added to the feedstock are provided in Table III, together with the results of various tests that were performed on the fiber-reinforced thermoplastic vulcanizate. Mechanical testing was also performed at high temperatures (125° C.) to analyze high temperature properties.

TABLE III

| | Samples 14-29 | | | | | | | |
|---|---|---|---|---|---|---|---|---|
| | 14 | 15 | 16 | 17 | 18 | 19 | 20 | 21 |
| TPV Feedstock | 58 | 60 | 52 | 52 | 66 | 58 | 60 | 64 |
| PET Fiber | 27 | 28 | 33 | 33 | 34 | 33 | 34 | 33 |
| Maleated Polypropylene | 12 | 12 | 12 | 12 | | | 6 | 6 |
| Methylene Acceptor I | 1 | | 1 | 1 | | 1 | | 1 |
| Methylene Donor | 2 | — | 2 | 2 | — | 2 | — | 2 |
| Test Results | | | | | | | | |
| Specific Gravity | 1.058 | 1.047 | 1.074 | 1.078 | 1.069 | 1.069 | 1.077 | 1.075 |
| Hardness Shore A | 90 | 91 | 90 | 90 | 81 | 90 | 86 | 86 |
| Hardness Shore D | 47 | 43 | 47 | 48 | 29 | 37 | 35 | 35 |
| With (@23° C.) | | | | | | | | |
| Ultimate Elongation (%) | 24 | 14 | 23 | 22 | 7 | 14 | 6 | 8 |
| 10% Modulus (MPa) | 17.94 | 14.43 | — | — | — | — | — | — |
| UTS (MPa) | 24.97 | 15.45 | — | — | — | — | — | — |
| Against (@23° C.) | | | | | | | | |
| Ultimate Elongation (%) | 34 | 25 | 13 | 26 | 25 | 27 | 10 | 10 |
| 10% Modulus (MPa) | 5.52 | 7.23 | — | — | — | — | — | — |
| UTS (MPa) | 7.92 | 9.16 | — | — | — | — | — | — |

TABLE III-continued

Samples 14-29

| With (@125° C.) | | | | | | | | |
|---|---|---|---|---|---|---|---|---|
| 10% Modulus (MPa) | 6.60 | 6.69 | — | — | — | — | — | — |
| UTS (MPa) | 12.13 | 12.02 | — | — | — | — | — | — |
| Maximum Strain (%) | 54 | 39 | — | — | — | — | — | — |
| Against (@125° C.) | | | | | | | | |
| 10% Modulus (MPa) | 2.70 | 1.87 | — | — | — | — | — | — |
| UTS (MPa) | 4.88 | 3.50 | — | — | — | — | — | — |
| Maximum Strain (%) | 45 | 32 | — | — | — | — | — | — |
| Heat Distortion Temperature, ° C. | 100 | 70 | — | — | — | — | — | — |

| | 22 | 23 | 24 | 25 | 26 | 27 | 28 | 29 |
|---|---|---|---|---|---|---|---|---|
| TPV Feedstock | 64 | 66 | 54 | 64 | 54 | 66 | 64 | 66 |
| PET Fiber | 27 | 34 | 34 | 21 | 34 | 28 | 21 | 22 |
| Maleated Polypropylene | 6 | | 12 | 12 | 12 | 6 | 12 | 12 |
| Methylene Acceptor I | 1 | | | 1 | | | 1 | |
| Methylene Donor | 2 | — | — | 2 | — | — | 2 | — |
| Test Results | | | | | | | | |
| Specific Gravity | 1.059 | 1.069 | 1.069 | 1.034 | 1.071 | 1.053 | 1.034 | 1.031 |
| Hardness Shore A | 90 | 86 | 80 | 90 | 88 | 92 | 88 | 90 |
| Hardness Shore D | 37 | 43 | 24 | 44 | 40 | 46 | 35 | 37 |
| With (@23° C.) | | | | | | | | |
| Ultimate Elongation (%) | 17 | 9 | 17 | 32 | 13 | 5 | 32 | 15 |
| 10% Modulus (MPa) | — | — | — | — | — | — | 12.08 | 11.69 |
| UTS (MPa) | — | — | — | — | — | — | 19.88 | 13.38 |
| Against (@23° C.) | | | | | | | | |
| Ultimate Elongation (%) | 25 | 27 | 7 | 46 | 28 | 12 | 41 | 35 |
| 10% Modulus (MPa) | — | — | — | — | — | — | 5.21 | 5.20 |
| UTS (MPa) | — | — | — | — | — | — | 8.06 | 7.05 |
| With (@125° C.) | | | | | | | | |
| 10% Modulus (MPa) | — | — | — | — | — | — | 6.00 | 4.51 |
| UTS (MPa) | — | — | — | — | — | — | 15.82 | 8.52 |
| Maximum Strain (%) | — | — | — | — | — | — | 53 | 32 |
| Against (@125° C.) | | | | | | | | |
| 10% Modulus (MPa) | — | — | — | — | — | — | 1.80 | 1.71 |
| UTS (MPa) | — | — | — | — | — | — | 3.55 | 3.70 |
| Maximum Strain (%) | — | — | — | — | — | — | 50 | 47 |
| Heat Distortion Temperature, ° C. | | | | | | | | |

The data in Table III shows that the compositions of the present invention can be optimized. Also, the data suggests that there may be a synergism between the fiber, the reaction product of the methylene donor and methylene acceptor, and the maleated plastic. Still further, the data shows advantageous high temperature performance of the thermoplastic vulcanizates of this invention.

Samples 30-37

Additional fiber-reinforced thermoplastic vulcanizate samples were prepared using similar thermoplastic vulcanizate feedstock and procedures as set forth in Samples 1-13 above. The ingredients added to the feedstock are provided in Table IV, together with the results of other tests that were performed on the fiber-reinforced thermoplastic vulcanizate. Data for fiber-reinforced thermoplastic vulcanizate without fiber alignment (i.e. isotropic) is also provided.

TABLE IV

| Material/% by Weight | 30 | 31 | 32 | 33 | 34 | 35 |
|---|---|---|---|---|---|---|
| TPV Feedstock | 66 | 66 | 66 | 64 | 66 | 64 |
| Hydrolysis Stabilizer | | 2 | | 2 | | 2 |
| PET Fiber | 22 | 21 | 21 | 21 | 21 | 21 |
| Maleated Polypropylene | 12 | 11 | 11 | 11 | | |
| Methylene Donor | | | 1 | 1 | 1 | 1 |
| Methylene Acceptor II | | | 1 | 1 | 1 | 1 |
| Polypropylene (0.8 MFR) | | | | | 11 | 11 |

TABLE IV-continued

| Material/% by Weight | 30 | 31 | 32 | 33 | 34 | 35 |
|---|---|---|---|---|---|---|
| Test Results | | | | | | |
| Specific Gravity | 1.036 | 1.035 | 1.022 | 1.025 | 1.034 | 1.036 |
| Hardness Shore A | 90 | 89 | 89 | 90 | 88 | 88 |
| Hardness Shore D | 37 | 37 | 38 | 36 | 37 | 36 |
| Weight Gain (%) | 45 | 47 | 45 | 44 | 46 | 47 |
| LCR Viscosity | 142 | 122 | 149 | 118 | 178 | 155 |
| Anisotropic-With (@23° C.) | | | | | | |
| 10% Modulus (MPa) | 8.01 | 6.12 | 10.11 | 9.59 | 8.27 | 6.42 |
| UTS (MPa) | 11.99 | 14.10 | 18.83 | 16.56 | 9.18 | 8.35 |
| Maximum Strain (%) | 24 | 47 | 42 | 34 | 20 | 37 |
| Anisotropic-Against (@23° C.) | | | | | | |
| 10% Modulus (MPa) | 3.95 | 3.60 | 3.40 | 3.38 | 2.87 | 2.65 |
| UTS (MPa) | 6.00 | 6.35 | 5.62 | 5.28 | 4.39 | 5.14 |
| Maximum Strain (%) | 43 | 58 | 50 | 43 | 79 | 104 |
| Isotropic (@23° C.) | | | | | | |
| 10% Modulus (MPa) | 8.33 | 7.25 | 6.62 | 7.12 | 7.42 | 4.88 |
| UTS (MPa) | 8.82 | 9.51 | 9.73 | 12.54 | 8.20 | 6.12 |
| Maximum Strain (%) | 12 | 28 | 29 | 37 | 35 | 56 |
| Weight Gain, % | 45 | 47 | 45 | 47 | 46 | 47 |
| LCR Viscosity, Pa s | 142 | 122 | 149 | 122 | 178 | 155 |

The data in Table IV shows that fiber-reinforced thermoplastic vulcanizates characterized by advantageously greater hydrolysis resistance can be prepared with the use of non-hygroscopic resins and a hydrolysis stabilizer without deleteriously compromising the advantageous properties demonstrated by the compositions of the invention. Further, the data suggests advantageous properties even where fiber alignment is not employed (i.e. isotropic).

Various modifications and alterations that do not depart from the scope and spirit of this invention will become apparent to those skilled in the art. This invention is not to be duly limited to the illustrative embodiments set forth herein.

What is claimed is:

1. A method of forming a fiber-reinforced thermoplastic vulcanizate, the method comprising:
   dynamically curing a rubber while the rubber is undergoing mixing with a thermoplastic resin to form a thermoplastic vulcanizate feedstock; and
   introducing fiber, a methylene donor, a methylene acceptor, and optionally a functionalized thermoplastic resin, with the thermoplastic vulcanizate feedstock to form the fiber-reinforced thermoplastic vulcanizate;
   wherein nylon is not added in either the dynamically curing step or the introducing step.

2. The method of claim 1, where a functionalized thermoplastic is introduced with the thermoplastic vulcanizate stock or with the reinforced thermoplastic vulcanizate.

3. The method of claim 2, where said step of introducing includes mixing the fiber, the methylene donor, the methylene acceptor, and the functionalized thermoplastic, with the thermoplastic vulcanizate feedstock at a temperature above the melt temperature of the thermoplastic vulcanizate feedstock.

4. The method of claim 3, where the mixing occurs at a temperature of from about 170° C. to about 220° C.

5. The method of claim 2, where said step of introducing includes introducing at least 1% and up to 50% by weight fiber based upon the total weight of the fiber-reinforced thermoplastic vulcanizate.

6. The method of claim 2, where said step of introducing includes introducing at least 4 and up to 20% by weight functionalized thermoplastic resin based upon the total weight of the fiber-reinforced thermoplastic vulcanizate.

7. The method of claim 2, where said step of introducing includes introducing at least 0.3 and up to 4% by weight methylene donor based upon the total weight of the fiber-reinforced thermoplastic vulcanizate.

8. The method of claim 2, where said step of introducing includes introducing at least 0.5 and up to 6% by weight methylene acceptor based upon the total weight of the fiber-reinforced thermoplastic vulcanizate.

9. The method of claim 2, farther comprising the step of aligning the fibers within the thermoplastic vulcanizate.

10. The method of claim 2, further comprising the step of introducing an unfunctionalized thermoplastic to the thermoplastic vulcanizate feedstock.

11. The method of claim 1, wherein the rubber is ethylene-propylene rubber.

12. The method of claim 1, wherein the thermoplastic resin is a propylene-based polymer.

* * * * *